United States Patent
Shigemura

(10) Patent No.: US 10,787,126 B2
(45) Date of Patent: Sep. 29, 2020

(54) MOUNTING ANGLE DETECTION DEVICE FOR IN-VEHICLE CAMERA, MOUNTING ANGLE CALIBRATION DEVICE, AND MOUNTING ANGLE DETECTION METHOD

(71) Applicant: DENSO CORPORATION, Kariya, Aichi-pref. (JP)

(72) Inventor: Shusaku Shigemura, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 129 days.

(21) Appl. No.: 16/088,627

(22) PCT Filed: Mar. 31, 2017

(86) PCT No.: PCT/JP2017/013759
§ 371 (c)(1),
(2) Date: Sep. 26, 2018

(87) PCT Pub. No.: WO2017/175687
PCT Pub. Date: Oct. 12, 2017

(65) Prior Publication Data
US 2019/0118712 A1    Apr. 25, 2019

(30) Foreign Application Priority Data

Apr. 3, 2016   (JP) ................. 2016-074817

(51) Int. Cl.
*H04N 7/18*      (2006.01)
*B60R 1/00*      (2006.01)
(Continued)

(52) U.S. Cl.
CPC ................ *B60R 1/00* (2013.01); *B60Q 9/00* (2013.01); *B60R 11/04* (2013.01); *B60R 21/00* (2013.01);
(Continued)

(58) Field of Classification Search
CPC .......... B60R 1/00; B60R 21/00; B60R 11/04; B60R 2300/607; H04N 5/232; H04N 7/18;
(Continued)

(56) References Cited

U.S. PATENT DOCUMENTS

2010/0292915 A1\* 11/2010 Ishigami ................. G01C 21/26
701/532
2011/0216194 A1\* 9/2011 Kosaki ...................... H04N 7/18
348/148

(Continued)

FOREIGN PATENT DOCUMENTS

JP      2006-100887 A     4/2006
JP      2011-182236 A     9/2011
(Continued)

*Primary Examiner* — Howard D Brown, Jr.
(74) *Attorney, Agent, or Firm* — Maschoff Brennan

(57) ABSTRACT

A mounting angle detection device converts, into a bird's-eye view image, an image captured of the ground on which a target marking having two straight line parts parallel to each other and equal in width is marked, and searches for a mounting angle at which the two straight line parts in the bird's-eye view image are parallel to each other and equal in width. Even with a vehicle including an in-vehicle camera on the front or back, the mounting angle detection device detects an actual mounting angle of the camera and calibrates the mounting angle of the camera. The mounting angle detection device detects the mounting angle using, as the target marking, even a parking space that lacks a transverse line crossing the two straight line parts parallel to each other and equal in width, and calibrates the mounting angle to a correct mounting angle of the camera.

9 Claims, 19 Drawing Sheets

(51) Int. Cl.
*H04N 5/232* (2006.01)
*G06T 1/00* (2006.01)
*H04N 5/225* (2006.01)
*B60R 21/00* (2006.01)
*B60Q 9/00* (2006.01)
*B60R 11/04* (2006.01)
*H04N 17/00* (2006.01)

(52) U.S. Cl.
CPC ............... *G06T 1/00* (2013.01); *H04N 5/225* (2013.01); *H04N 5/232* (2013.01); *H04N 7/18* (2013.01); *H04N 17/002* (2013.01); *B60R 2300/607* (2013.01)

(58) Field of Classification Search
CPC ........ H04N 5/225; H04N 17/002; G06T 1/00; B60Q 9/00
See application file for complete search history.

(56) References Cited

U.S. PATENT DOCUMENTS

| | | | |
|---|---|---|---|
| 2013/0147654 A1* | 6/2013 | Choi | H01Q 25/00 342/70 |
| 2016/0347251 A1* | 12/2016 | Shigemura | G06K 9/00805 |
| 2017/0184396 A1* | 6/2017 | Tateishi | B60W 40/072 |
| 2019/0078876 A1* | 3/2019 | Ouchida | G06T 1/0007 |
| 2019/0079164 A1* | 3/2019 | Lim | G01S 7/40 |
| 2019/0382005 A1* | 12/2019 | Nishi | B60R 21/00 |
| 2020/0110154 A1* | 4/2020 | Moon | G01S 7/4026 |

FOREIGN PATENT DOCUMENTS

| | | |
|---|---|---|
| JP | 2013-222302 | 10/2013 |
| JP | 2016-001776 | 1/2016 |
| JP | 2016-100887 | 5/2016 |

\* cited by examiner

FIG.8

| | | n=1 | n=2 | n=3 | ••••• | DISPERSION |
|---|---|---|---|---|---|---|
| STRAIGHT CENTER LINE bc | SLOPE kbc | kbc1 | kbc2 | kbc3 | | $\sigma$kbc |
| | INTERCEPT POSITION pbc | pbc1 | pbc2 | pbc3 | | $\sigma$pbc |
| STRAIGHT CENTER LINE ac | SLOPE kac | kac1 | kac2 | kac3 | | $\sigma$kac |
| | INTERCEPT POSITION pac | pac1 | pac2 | pac3 | | $\sigma$pac |
| STRAIGHT BOUNDARY LINE bo | SLOPE kbo | kbo1 | kbo2 | kbo3 | | $\sigma$kbo |
| | INTERCEPT POSITION pbo | pbo1 | pbo2 | pbo3 | | $\sigma$pbo |
| STRAIGHT BOUNDARY LINE bi | SLOPE kbi | kbi1 | kbi2 | kbi3 | | $\sigma$kbi |
| | INTERCEPT POSITION pbi | pbi1 | pbi2 | pbi3 | | $\sigma$pbi |
| STRAIGHT BOUNDARY LINE ao | SLOPE kao | kao1 | kao2 | kao3 | | $\sigma$kao |
| | INTERCEPT POSITION pao | pao1 | pao2 | pao3 | | $\sigma$pao |
| STRAIGHT BOUNDARY LINE ai | SLOPE kai | kai1 | kai2 | kai3 | | $\sigma$kai |
| | INTERCEPT POSITION pai | pai1 | pai2 | pai3 | | $\sigma$pai |

FIG.12
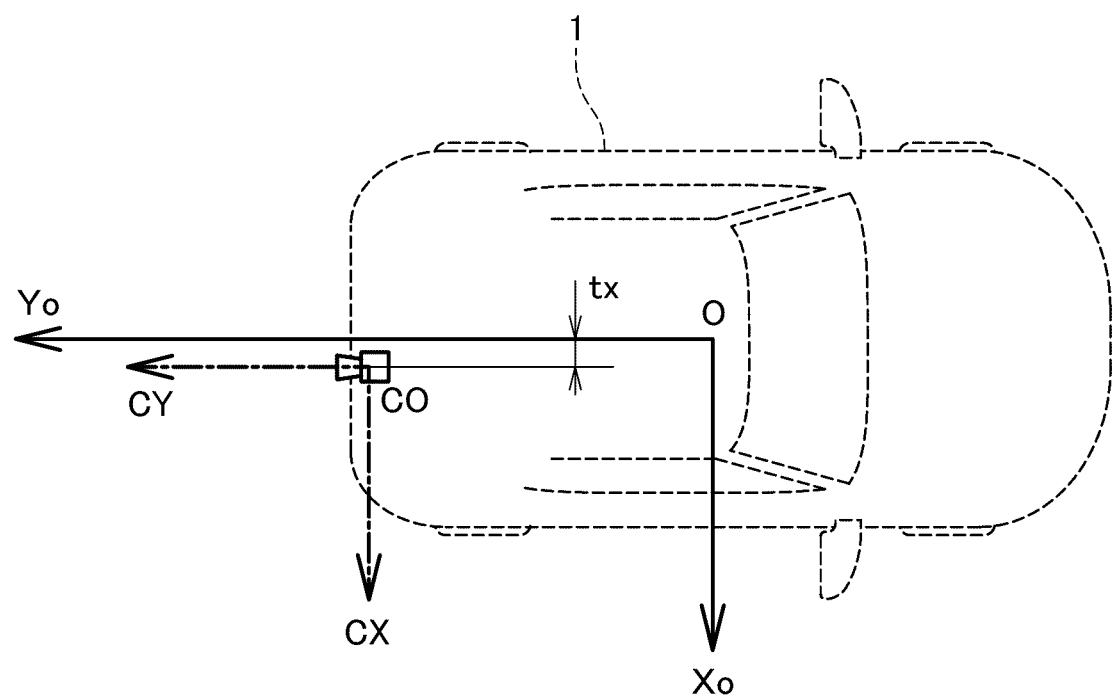
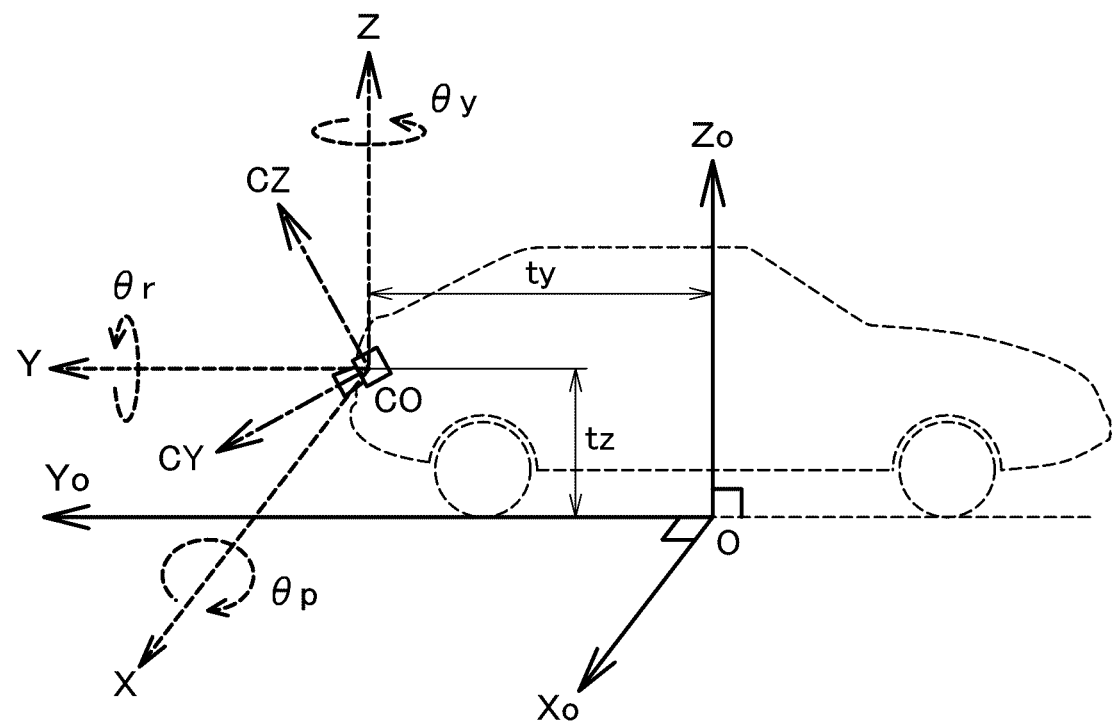

FIG.13

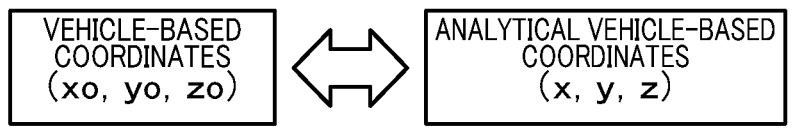

$$\begin{pmatrix} x \\ y \\ z \end{pmatrix} = \begin{pmatrix} xo \\ yo \\ zo \end{pmatrix} - \begin{pmatrix} tx \\ ty \\ tz \end{pmatrix} \quad \text{-------- (1)}$$

FIG.14

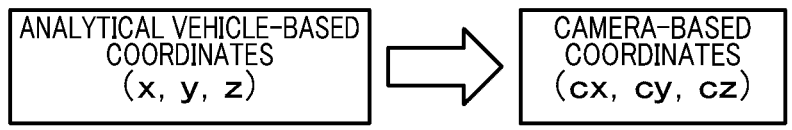

$$\begin{pmatrix} cx \\ cy \\ cz \end{pmatrix} = [P][R][Y] \begin{pmatrix} x \\ y \\ z \end{pmatrix} \quad \text{-------- (2)}$$

$$[P] = \begin{pmatrix} 1 & 0 & 0 \\ 0 & \cos\theta p & -\sin\theta p \\ 0 & \sin\theta p & \cos\theta p \end{pmatrix}$$

$$[R] = \begin{pmatrix} \cos\theta r & 0 & -\sin\theta r \\ 0 & 1 & 0 \\ \sin\theta r & 0 & \cos\theta r \end{pmatrix}$$

$$[Y] = \begin{pmatrix} \cos\theta y & -\sin\theta y & 0 \\ \sin\theta y & \cos\theta y & 0 \\ 0 & 0 & 1 \end{pmatrix}$$

FIG.15
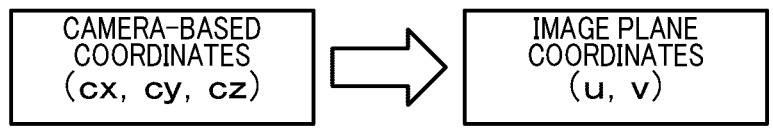
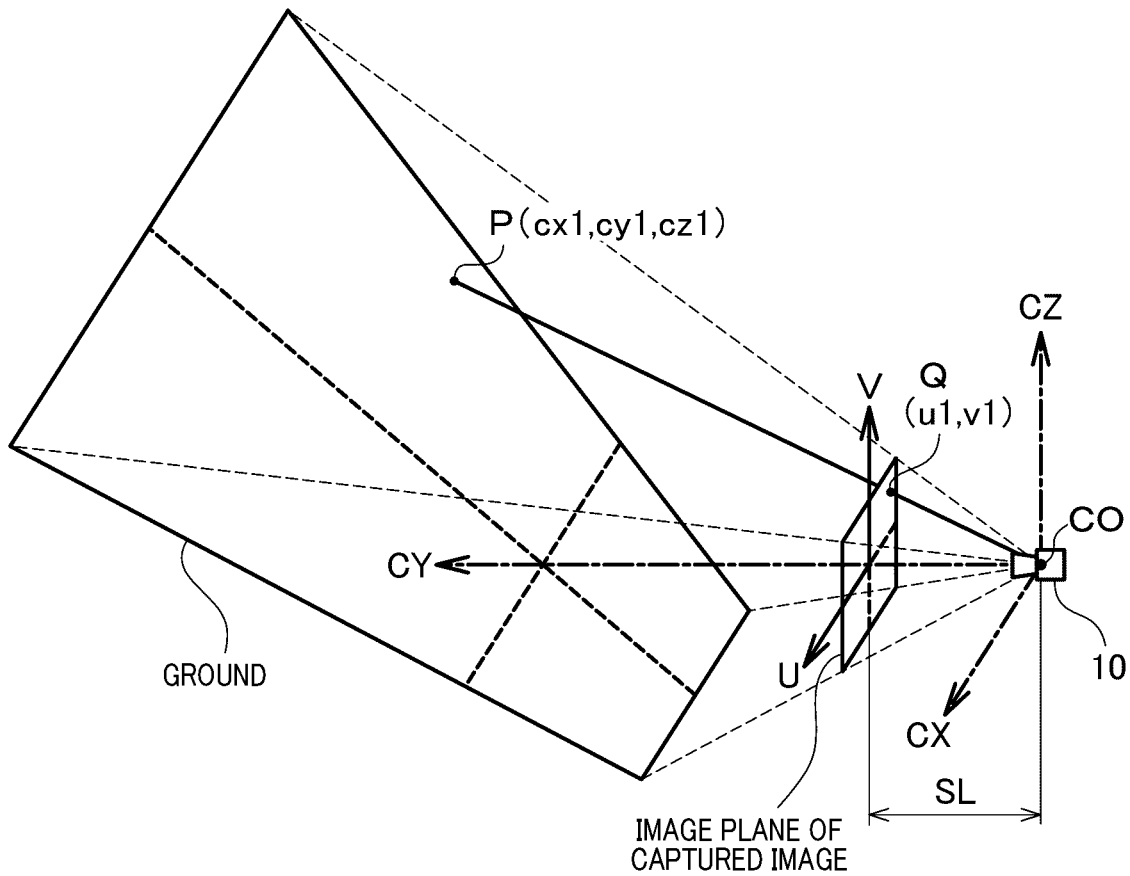
$$\begin{cases} u = L \cdot (cx/cy) \\ v = L \cdot (cz/cy) \end{cases} \quad \text{------- (3)}$$

MOUNTING ANGLE DETECTION DEVICE FOR IN-VEHICLE CAMERA, MOUNTING ANGLE CALIBRATION DEVICE, AND MOUNTING ANGLE DETECTION METHOD

CROSS-REFERENCE TO RELATED APPLICATION

This application is based on and claims the benefit of priority from earlier Japanese Patent Application No. 2016-074817 filed on Apr. 3, 2016, the entire description of which is incorporated herein by reference.

TECHNICAL FIELD

The present disclosure relates to a technique of detecting a mounting angle at which an in-vehicle camera for capturing an image around a vehicle is mounted on the vehicle, and calibrating the mounting angle.

BACKGROUND ART

As a driver assistance technology, various techniques have come into use which allow a driver to easily check a situation around a vehicle by displaying, on a monitor screen, an image captured by an in-vehicle camera. One example of a technique in use that assists rearward travel is as follows. Specifically, an in-vehicle camera is mounted on the rear of a vehicle, and during rearward movement of the vehicle, an image captured of a rear view is displayed on a monitor screen, and a predicted path of travel of the vehicle is displayed by superimposition on the captured image.

One example of a technique in use for allowing a driver to easily grasp the situation around a vehicle is as follows. Specifically, in-vehicle cameras are mounted on the front, rear, left, and right parts of a vehicle, images captured by these in-vehicle cameras are converted into a bird's-eye view image (in which the surroundings of the vehicle appear as if viewed from above), and the bird's-eye view image is displayed on a monitor screen.

The abovementioned techniques are based on the premise that the in-vehicle cameras are mounted on the vehicle at correct angles as designed. Assume that there is an offset in the mounting angle of an in-vehicle camera. In this case, during rearward movement of the vehicle, for example, an offset occurs between an actual path of travel and a predicted path of travel that is displayed by superimposition on an image captured of a rear view. Furthermore, in the case where there is an offset in the mounting angle, when the images captured by the in-vehicle cameras on the front, rear, left, and right parts of the vehicle are converted into a bird's-eye view image and the bird's-eye view image is displayed, a position offset occurs, for example, between the bird's-eye view image from the left in-vehicle camera and the bird's-eye view image from the front in-vehicle camera. The same or similar issue may occur between the right in-vehicle camera and the front in-vehicle camera, between the left in-vehicle camera and the rear in-vehicle camera, and between the right in-vehicle camera and the rear in-vehicle camera.

The mounting angle of the in-vehicle camera with respect to the vehicle has been adjusted at the time of shipment of the vehicle from a factory. However, there are cases where the mounting angle needs to be re-adjusted such as when an offset occurs due to long-term use or when the in-vehicle camera is removed for repairs.

Thus, the following technique has been presented (Patent Literature (PTL) 1). Specifically, in the technique disclosed in PTL 1, a vehicle is moved into a frame such as a parking space which has a well-known shape, and the viewpoints of images captured by the in-vehicle cameras on the front, rear, left, and right parts of the vehicle are converted. Thus, in the technique disclosed in PTL 1, the mounting angle of each in-vehicle camera with respect to the vehicle is determined. Assume that the mounting angles of the in-vehicle cameras are correct. In this case, the bird's-eye view image obtained by converting the images captured by the in-vehicle cameras has no position offset even at image connecting portions.

Focusing on this point, in the technique disclosed in PTL 1, the mounting angles of the in-vehicle cameras with respect to the vehicle are determined so that no position offset occurs between the bird's-eye view images obtained by converting the images captured by the in-vehicle cameras. In this way, when the mounting angle of each in-vehicle camera can be determined, the mounting angle can be adjusted to fall within a tolerance range; thus, the mounting angle can be calibrated.

CITATION LIST

Patent Literature

[PTL 1] JP 2011-182236 A

SUMMARY OF THE INVENTION

Technical Problem

The abovementioned technique that has been proposed, however, relies on the premise that the in-vehicle cameras are mounted on the front, rear, left, and right parts of the vehicle and, using these in-vehicle cameras, captured images of areas around the entire perimeter of the vehicle are obtained. Therefore, when the in-vehicle camera is not mounted in any of the front, rear, left, and right parts of the vehicle (for example, when the in-vehicle cameras are mounted only on the front and the rear of the vehicle), the mounting angles of the in-vehicle cameras with respect to the vehicle cannot be detected or calibrated to correct mounting angles.

The present disclosure aims to provide a technique in which, even with a vehicle including an in-vehicle camera not on every one of the front, rear, left, and right parts, the mounting angle of the in-vehicle camera with respect to the vehicle can be detected and calibrated to a correct mounting angle.

Solution to Problem

A mounting angle detection device according to one aspect of the technique of the present disclosure obtains a captured image of the ground on which a target marking having two straight line parts that are parallel to each other and equal in width is marked. The mounting angle detection device converts, into a bird's-eye view image, the captured image that has been obtained. The mounting angle detection device determines whether the two straight line parts of the target marking in the bird's-eye view image resulting from the conversion are parallel to each other and equal in width. As a result, when the two straight line parts are not parallel or not equal in width, the mounting angle detection device determines that the mounting angle at the time of conversion into the bird's-eye view image is not an actual mounting angle of an in-vehicle camera. By changing the mounting angle, the mounting angle detection device searches for a mounting angle at which the two straight line parts of the target marking are parallel to each other and equal in width. When an appropriate mounting angle is successfully retrieved by the search, the mounting angle detection device determines, as an actual mounting angle (correct mounting angle), the mounting angle retrieved by the search.

Thus, according to the technique of the present disclosure, even with a vehicle including the in-vehicle camera not on every one of the front, rear, left, and right parts, the mounting angle of the in-vehicle camera with respect to the vehicle can be detected and calibrated to a correct mounting angle.

The target marking has two straight line parts that are parallel to each other and equal in width. Thus, the target marking may be, for example, a graphic such as a parking space which has two side lines that are parallel to each other and equal in width, but does not have a transverse line crossing the side lines. With the technique of the present disclosure, using such a target marking, the mounting angle of an in-vehicle camera 10 can be detected and calibrated to a correct mounting angle.

BRIEF DESCRIPTION OF THE DRAWINGS

FIG. 8 shows the case of accumulating the detected straight center lines and straight boundary lines of side lines from a plurality of captured images.

FIG. 12 shows the relationship between a vehicle-based coordinate system and a camera-based coordinate system.

FIG. 13 shows a method for converting a vehicle-based coordinate system into an analytical vehicle-based coordinate system.

FIG. 14 shows a method for converting an analytical vehicle-based coordinate system into a camera-based coordinate system.

FIG. 15 shows the case of converting a camera-based coordinate system into an image plane coordinate system.

DESCRIPTION OF THE EMBODIMENTS

Hereinafter, the above technique of the present disclosure will be described through specific embodiments as examples with reference to the drawings.

A. First Embodiment

Figure 1:
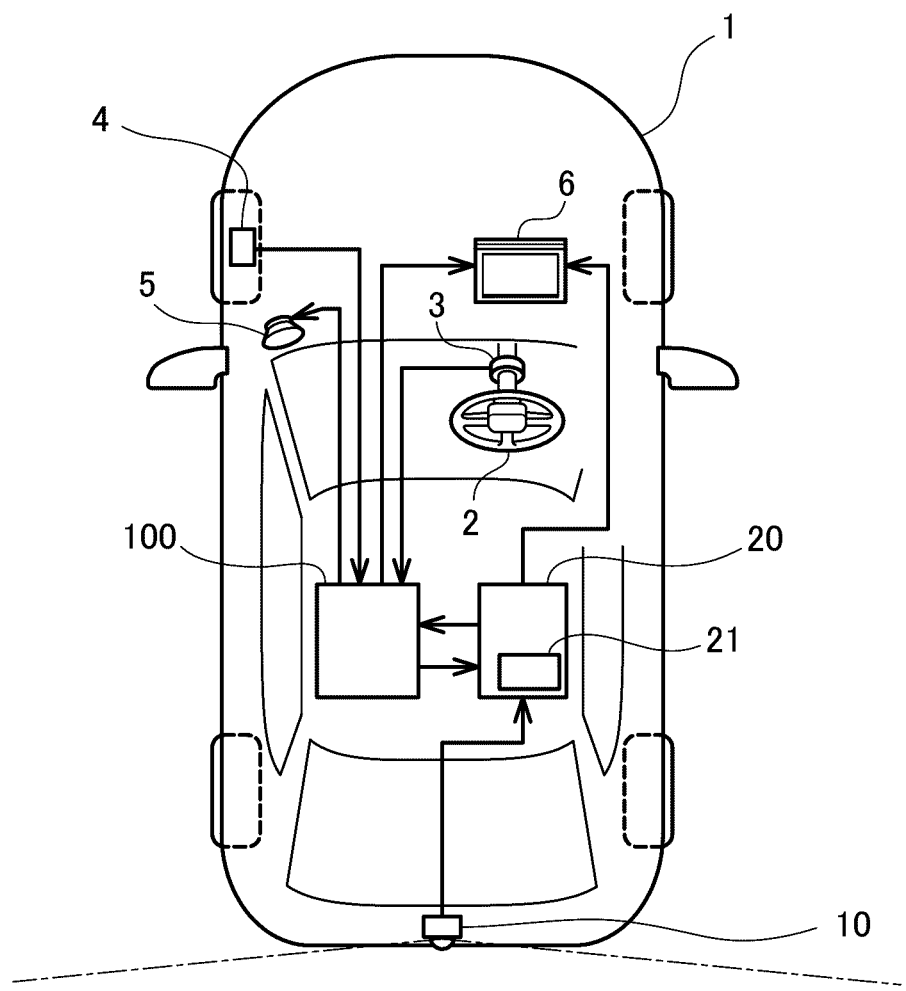
FIG. 1 shows an outline configuration of a vehicle on which an in-vehicle camera is mounted.

A-1. Device Configuration:

FIG. 1 exemplifies an outline configuration of a vehicle 1 on which an in-vehicle camera 10 is mounted. In the example shown in the figure, the in-vehicle camera 10 is mounted on the rear of the vehicle 1 obliquely downward and thus is capable of capturing a rear view of the vehicle 1 from obliquely above. The image captured by the in-vehicle camera 10 is displayed on a monitor 6 via an image generation device 20. With this, a driver visually checks the image displayed on the monitor 6. As a result, the rear view of the vehicle 1 can be checked.

In the subsequent description, it is assumed that the in-vehicle camera 10 is mounted on the rear of the vehicle 1. However, this is not limiting. The in-vehicle camera 10 may be mounted on the front of the vehicle 1.

The image generation device 20 includes, for example, a distortion correction function and an image conversion function for an image captured by the in-vehicle camera 10. With the distortion correction function, the image captured by the in-vehicle camera 10 from obliquely above is converted into an image that is easy to view through removal of distortions due to an optical system of the in-vehicle camera 10. Subsequently, the image resulting from the conversion (the captured image after the distortion correction) is displayed on the monitor 6. With the image conversion function, the captured image after the distortion correction is converted into a bird's-eye view image. Subsequently, the image resulting from the conversion (the bird's-eye view image in which the surroundings of the vehicle 1 appear as if viewed from (directly) above) is displayed on the monitor 6. The image generation device 20 includes, for example, a storage unit 21 such as a memory. The storage unit 21 stores, for example, data for removing a distortion due to the optical system (distortion correction data) and data of the mounting angle of the in-vehicle camera 10 at the time of the bird's-eye view conversion. Thus, when obtaining the image captured by the in-vehicle camera 10, the image generation device 20 converts the image using the data read from the storage unit 21. Thus, the image to be displayed on the monitor 6 is generated. In this way, a driver visually checks the image displayed on the monitor 6. Accordingly, the situation around the vehicle 1 can be easily grasped.

Here, the bird's-eye view conversion of the captured image is based on the premise that the in-vehicle camera 10 is mounted on the vehicle 1 at a correct angle. The mounting angle of the in-vehicle camera 10 has been adjusted to a correct angle at the time of shipment of the vehicle 1 from a factory. However, an offset occurs in the mounting angle due to some reason such as long-term use. When such an offset occurs in the mounting angle, the bird's-eye view image is a distorted image.

Thus, in the present embodiment, the vehicle 1 includes a mounting angle calibration device 100 which calibrates the mounting angle of the in-vehicle camera 10 with respect to the vehicle 1. The mounting angle calibration device 100 according to the present embodiment is connected to the image generation device 20. The mounting angle calibration device 100 obtains the captured image after the distortion correction from the image generation device 20. The mounting angle calibration device 100 searches for an appropriate amounting angle of the in-vehicle camera 10 on the basis of the captured image that has been obtained. A method for searching for the mounting angle of the in-vehicle camera 10 will be described later. When successfully retrieving an appropriate mounting angle, the mounting angle calibration device 100 changes the value of the mounting angle stored in the storage unit 21 in the image generation device 20 into the value of the mounting angle retrieved by the search. Thus, the mounting angle calibration device 100 calibrates the mounting angle of the in-vehicle camera 10.

In order for the mounting angle calibration device 100 to retrieve an appropriate mounting angle of the in-vehicle camera 10 by the search, the vehicle 1 needs to move an appropriate distance in the state where a steering wheel 2 is upright (in a steering state for movement in a straight line). Thus, in the present embodiment, for example, a steering angle sensor 3 which detects a steering angle of the steering wheel 2 and a travel distance sensor 4 which detects a travel distance of the vehicle 1 are connected to the mounting angle calibration device 100. Upon calibrating the mounting angle of the in-vehicle camera 10, the mounting angle calibration device 100 monitors, for example, the steering state of the steering wheel 2 and the travel distance of the vehicle 1. As a result, when the steering wheel 2 is not in the steering state for movement in a straight line or the vehicle 1 has not been moving (when the condition for retrieving an appropriate mounting angle is not met), the mounting angle calibration device 100 provides a warning using the following method. Specifically, the monitor 6 is used to display a warning image, or a speaker 5 is used to output a warning sound, for example. Thus, the mounting angle calibration device 100 prompts recalibration of the mounting angle of the in-vehicle camera 10.

Figure 2:
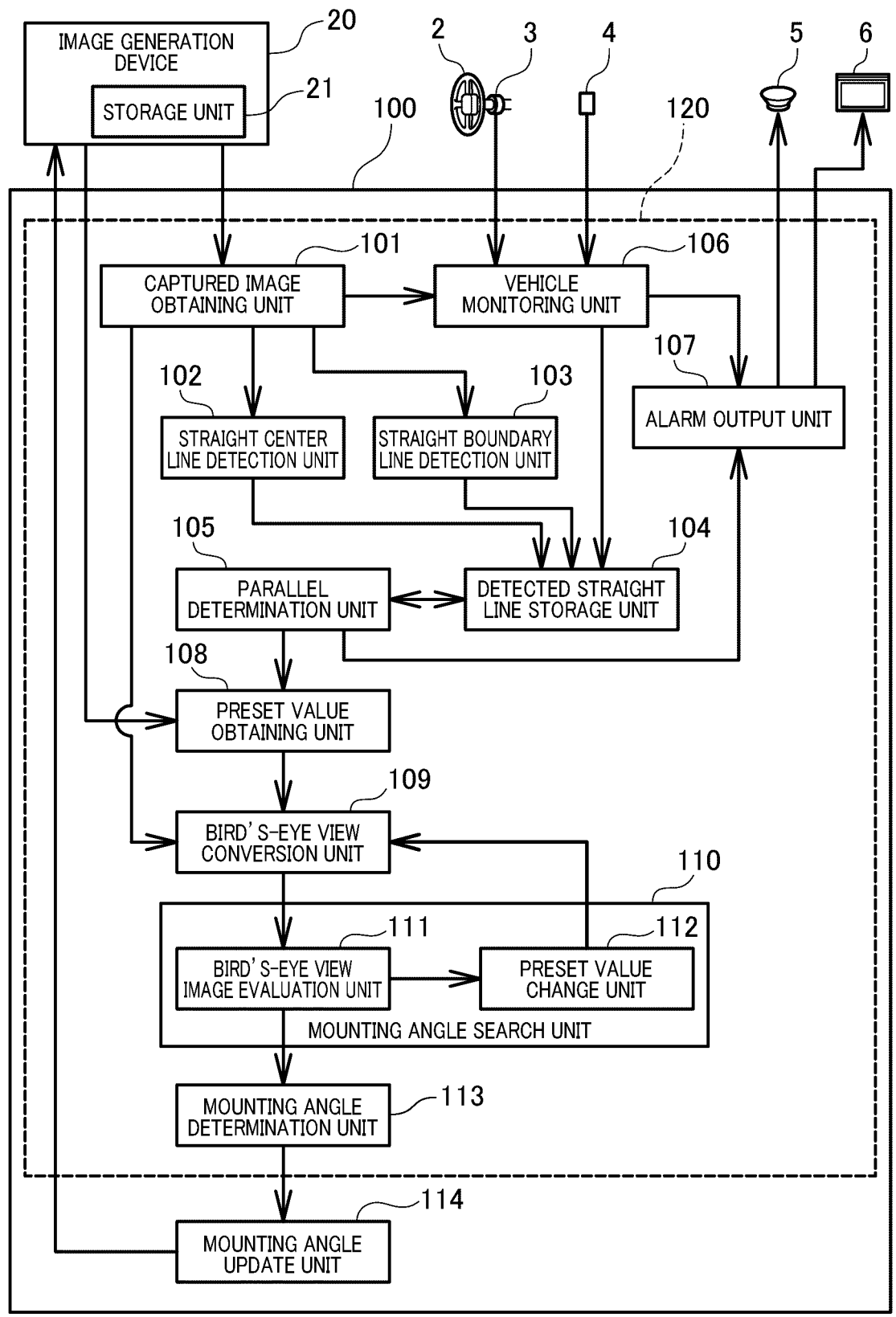
FIG. 2 is a block diagram showing the internal structure of a mounting angle calibration device according to the first embodiment.

A-2. Internal Structure of Mounting Angle Calibration Device 100:

FIG. 2 exemplifies a block diagram showing the internal structure of the mounting angle calibration device 100 according to the present embodiment. As exemplified in FIG. 2, the mounting angle calibration device 100 according to the present embodiment includes a captured image obtaining unit 101, a straight center line detection unit 102, a straight boundary line detection unit 103, a detected straight line storage unit 104, a parallel determination unit 105, a vehicle monitoring unit 106, and an alarm output unit 107. Furthermore, the mounting angle calibration device 100 includes: a preset value obtaining unit 108; a bird's-eye view conversion unit 109; a mounting angle search unit 110 including a bird's-eye view image evaluation unit 111 and a preset value change unit 112; a mounting angle determination unit 113; and a mounting angle update unit 114. Note that the portion of the mounting angle calibration device 100 that excludes the mounting angle update unit 114 (the portion enclosed by the dashed line in FIG. 2) corresponds to a mounting angle detection device 120 according to the present embodiment.

The abovementioned units are abstract concepts in which the internal structure of the mounting angle calibration device 100 is given for the sake of description, focusing on the function of the mounting angle calibration device 100 for detecting the mounting angle of the in-vehicle camera 10 and calibrating the mounting angle. Thus, the above expression does not indicate that the mounting angle calibration device 100 is necessarily physically divided into the respective abovementioned units. The abovementioned units can be provided, for example, in the following method. Specifically, for example, each of the abovementioned units can be implemented as a program that is executed by a central processing unit (CPU) included in a microcomputer or can be implemented as an electronic circuit including a large scale integration (LSI) circuit, a memory, and the like. Furthermore, these may be combined to implement the abovementioned units. In the present embodiment, the mounting angle calibration device 100 includes a microcomputer which mainly includes a CPU, a memory (for example, a non-transitory tangible computer readable storage medium such as a read-only memory (ROM) and a random-access memory (RAM)). Thus, each of the abovementioned units is implemented as a program that is executed by the CPU.

The captured image obtaining unit 101 obtains, from the image generation device 20, an image obtained by removing distortions due to the optical system of the in-vehicle camera 10 from the captured image (the captured image after the distortion correction). Upon detecting the mounting angle of the in-vehicle camera 10, the captured image obtaining unit 101 obtains an image of the ground on which a predetermined target marking is marked.

The target marking means a graphic having two straight line parts that are parallel to each other and equal in width which are marked on the ground, for example around/in a parking space. For example, the parking space indicating a parking range for one vehicle in a parking area or the like includes side lines indicating the boundaries between the parked vehicle and vehicles on both sides of the parked vehicle. The side lines of the parking space correspond to two straight line parts that are parallel to each other and equal in width. Thus, the parking space can be used as a representative target marking. Specific examples of the target marking will be described later.

The straight center line detection unit 102 detects two straight line parts of the target marking included in the captured image obtained by the captured image obtaining unit 101, and detects a straight center line corresponding to the center line of each of the straight line parts. The target marking has two straight line parts. Thus, the straight center line detection unit 102 detects one straight center line for each of the straight line parts, i.e., two straight center lines in total. The straight center line detection unit 102 stores the two detected straight center lines into the detected straight line storage unit 104.

The straight boundary line detection unit 103 detects two straight line parts of the target marking included in the captured image obtained by the captured image obtaining unit 101, and detects straight boundary lines corresponding to boundary lines on both sides of each of the straight line parts. The target marking has two straight line parts. Thus, the straight boundary line detection unit 103 detects two straight boundary lines for each of the straight line parts, i.e., four straight boundary lines in total. The straight boundary line detection unit 103 stores the four detected straight boundary lines into the detected straight line storage unit 104. Thus, the plurality of straight center lines and straight boundary lines detected from the plurality of captured images are stored in the detected straight line storage unit 104. In other words, the detected straight line storage unit 104 corresponds to a predetermined storage region such as a memory included in the mounting angle calibration device 100.

Specific examples in which two straight center lines and four straight boundary lines are detected from the target marking will be described later.

The parallel determination unit 105 reads and analyzes the plurality of straight center lines and straight boundary lines stored in the detected straight line storage unit 104. On the basis of the analysis result, the parallel determination unit 105 determines whether the orientation of the vehicle 1 is parallel to the two straight line parts of the target marking marked on the ground. A method for determining whether the orientation is parallel to the two straight line parts will be described with reference to other figures.

In order for the parallel determination unit 105 to correctly determine the orientation of the vehicle 1 with respect to the two straight line parts of the target marking, the plurality of captured images need to be obtained in the state where the vehicle 1 is moving straight at least a predetermined distance.

Thus, in the present embodiment, the vehicle monitoring unit 106 monitors the state of the vehicle 1 during a period in which the captured image obtaining unit 101 obtains a captured image. The vehicle monitoring unit 106 is connected to the steering angle sensor 3 and the travel distance sensor 4. The vehicle monitoring unit 106 monitors the steering state of the steering wheel 2, the travel distance of the vehicle 1, and the like. When the steering wheel 2 is steered or the travel distance of the vehicle 1 is not enough during the period in which the plurality of captured images are obtained, the vehicle monitoring unit 106 determines that the captured image needs to be re-obtained. As a result, the vehicle monitoring unit 106 discards the detection results of the straight center lines and the straight boundary lines stored in the detected straight line storage unit 104. Furthermore, the vehicle monitoring unit 106 outputs, to the alarm output unit 107, the determination result indicating that the captured image needs to be re-obtained.

The alarm output unit 107 is connected to the speaker 5, the monitor 6, and the like. When receiving from the vehicle monitoring unit 106 the determination result indicating that the captured image needs to be re-obtained, the alarm output unit 107 outputs a warning to that effect using the speaker 5, the monitor 6, and the like.

When determining that the orientation of the vehicle 1 is not parallel to the two straight line parts of the target marking, the parallel determination unit 105 discards the detection results of the straight center lines and the straight boundary lines stored in the detected straight line storage unit 104. The parallel determination unit 105 outputs, to the alarm output unit 107, the determination result indicating that the captured image needs to be re-obtained. The alarm output unit 107 outputs a warning to that effect using the speaker 5, the monitor 6, and the like.

In contrast, when the parallel determination unit 105 determines that the orientation of the vehicle 1 is parallel to the two straight line parts of the target marking, the preset value obtaining unit 108 obtains a preset value of the mounting angle of the in-vehicle camera 10 from the image generation device 20. The mounting angle of the in-vehicle camera 10 is stored in the storage unit 21 in the image generation device 20.

Furthermore, when the parallel determination unit 105 determines that the orientation of the vehicle 1 is parallel to the two straight line parts of the target marking, the bird's-eye view conversion unit 109 converts the captured image into a bird's-eye view image as follows. Specifically, the bird's-eye view conversion unit 109 reads the captured image obtained by the captured image obtaining unit 101. At this time, the bird's-eye view conversion unit 109 reads the captured image that is the latest among the captured images obtained by the captured image obtaining unit 101. The bird's-eye view conversion unit 109 converts the captured image into a bird's-eye view image assuming that the mounting angle of the in-vehicle camera 10 and the mounting angle read from the storage unit 21 in the image generation device 20 match.

The bird's-eye view image evaluation unit 111 evaluates, by analyzing the bird's-eye view image resulting from the conversion by the bird's-eye view conversion unit 109, the parallelism of the two straight line parts of the target marking and the difference in width between the two straight line parts. When both of the parallelism and the difference in width are not within predetermined tolerance ranges, the bird's-eye view image evaluation unit 111 outputs this evaluation result to the preset value change unit 112. Consequently, on the basis of the input evaluation result, the preset value change unit 112 changes the preset value of the mounting angle of the in-vehicle camera 10 obtained from the storage unit 21 in the image generation device 20, and outputs a value after the change to the bird's-eye view conversion unit 109.

Thus, the bird's-eye view conversion unit 109 performs the bird's-eye view conversion again. Specifically, using the mounting angle after the change, the bird's-eye view conversion unit 109 performs the bird's-eye view conversion again on the captured image, thus generating a new bird's-eye view image. The bird's-eye view image evaluation unit 111 evaluates, on the new bird's-eye view image resulting from the conversion by the bird's-eye view conversion unit 109, the parallelism of the two straight line parts of the target marking and the difference in width between the two straight line parts. When the bird's-eye view image evaluation unit 111 determines that both of the parallelism and the difference in width are not in the predetermined tolerance ranges, the preset value change unit 112 changes the value of the mounting angle of the in-vehicle camera 10 again.

In this way, the bird's-eye view image evaluation unit 111 and the preset value change unit 112 repeat the above-described processes until a predetermined condition is met. Specifically, the preset value change unit 112 changes the mounting angle of the in-vehicle camera 10 on the basis of the evaluation result of the bird's-eye view image. The bird's-eye view image evaluation unit 111 converts the captured image into a bird's-eye view image again using the mounting angle after the change, and performs the evaluation again. In other words, the bird's-eye view image evaluation unit 111 and the preset value change unit 112 change the preset value of the mounting angle of the in-vehicle camera 10 that is to be used in the bird's-eye view conversion, and re-evaluate the captured image. In this way, the mounting angle at which the two straight line parts of the target marking in the bird's-eye view image meet predetermined criteria is retrieved by the search. Thus, the bird's-eye view image evaluation unit 111 and the preset value change unit 112 correspond to the mounting angle search unit 110.

When determining that the two straight line parts of the target marking in the bird's-eye view image meet the predetermined criteria, the bird's-eye view image evaluation unit 111 outputs, to the mounting angle determination unit 113, the value of the mounting angle used in the bird's-eye view conversion at that time. As a result, the mounting angle determination unit 113 determines the input value of the mounting angle as a correct value of the mounting angle (an actual value of the mounting angle). In this way, the mounting angle detection device 120 according to the present embodiment can detect a correct mounting angle of the in-vehicle camera 10.

Furthermore, the mounting angle update unit 114 obtains the correct mounting angle of the in-vehicle camera 10 determined by the mounting angle determination unit 113, and writes the obtained mounting angle into the storage unit 21 in the image generation device 20. Thus, the mounting angle update unit 114 updates, into the correct value of the mounting angle, the value of the mounting angle stored in the storage unit 21 in the image generation device 20. As described above, the mounting angle calibration device 100 according to the present embodiment performs the processes of the abovementioned units. This brings to an end the calibration of the mounting angle of the in-vehicle camera 10 which is to be used by the image generation device 20 upon generating an image (an image to be displayed on the monitor 6).

Hereinafter, the processes performed by the mounting angle calibration device 100 according to the present embodiment which has the above-described internal structure upon calibrating the mounting angle of the in-vehicle camera 10 will be described based on specific examples.

Figure 3:
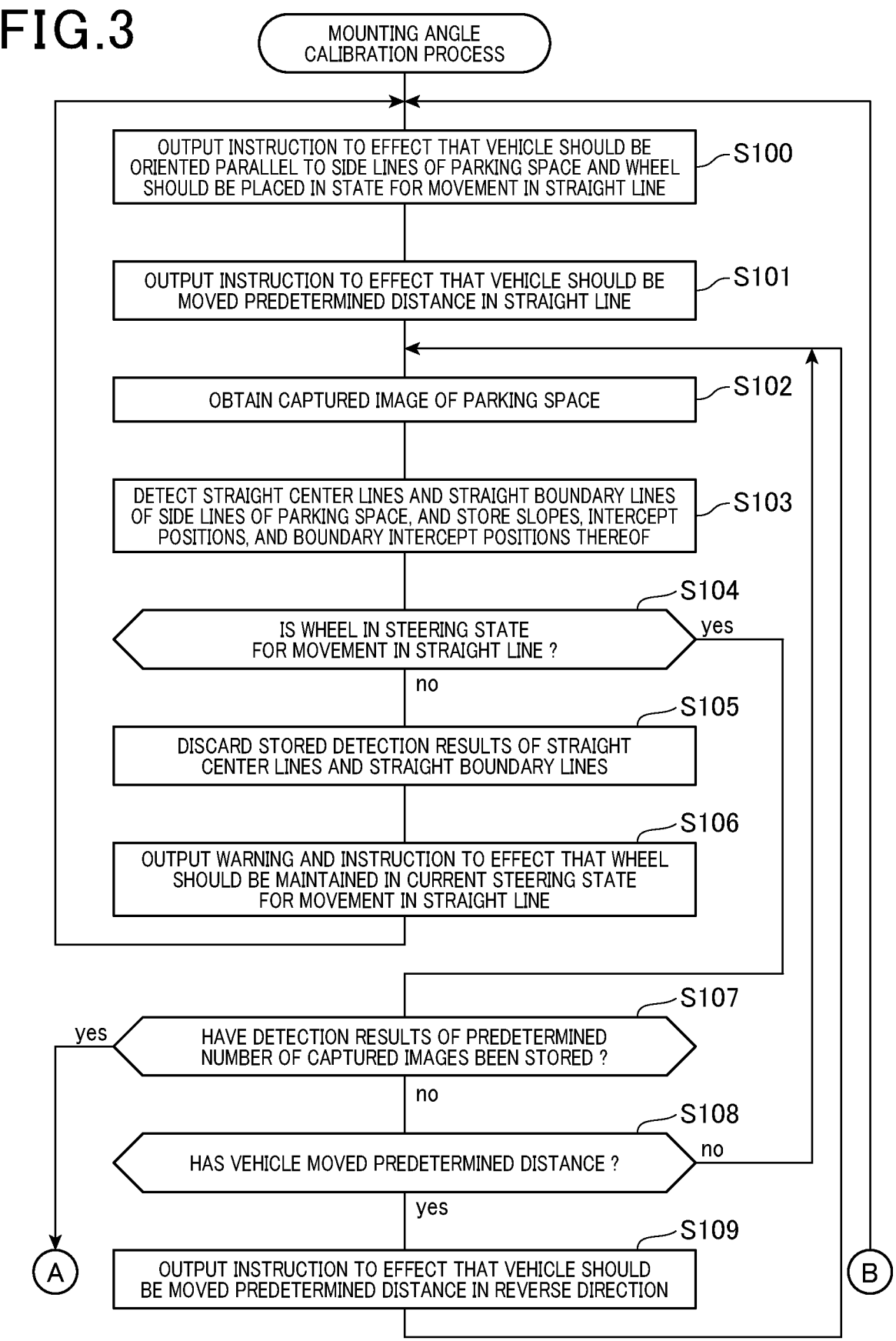
FIG. 3 is a flowchart showing a mounting angle calibration process performed by a mounting angle calibration device according to the first embodiment.
Figure 4:
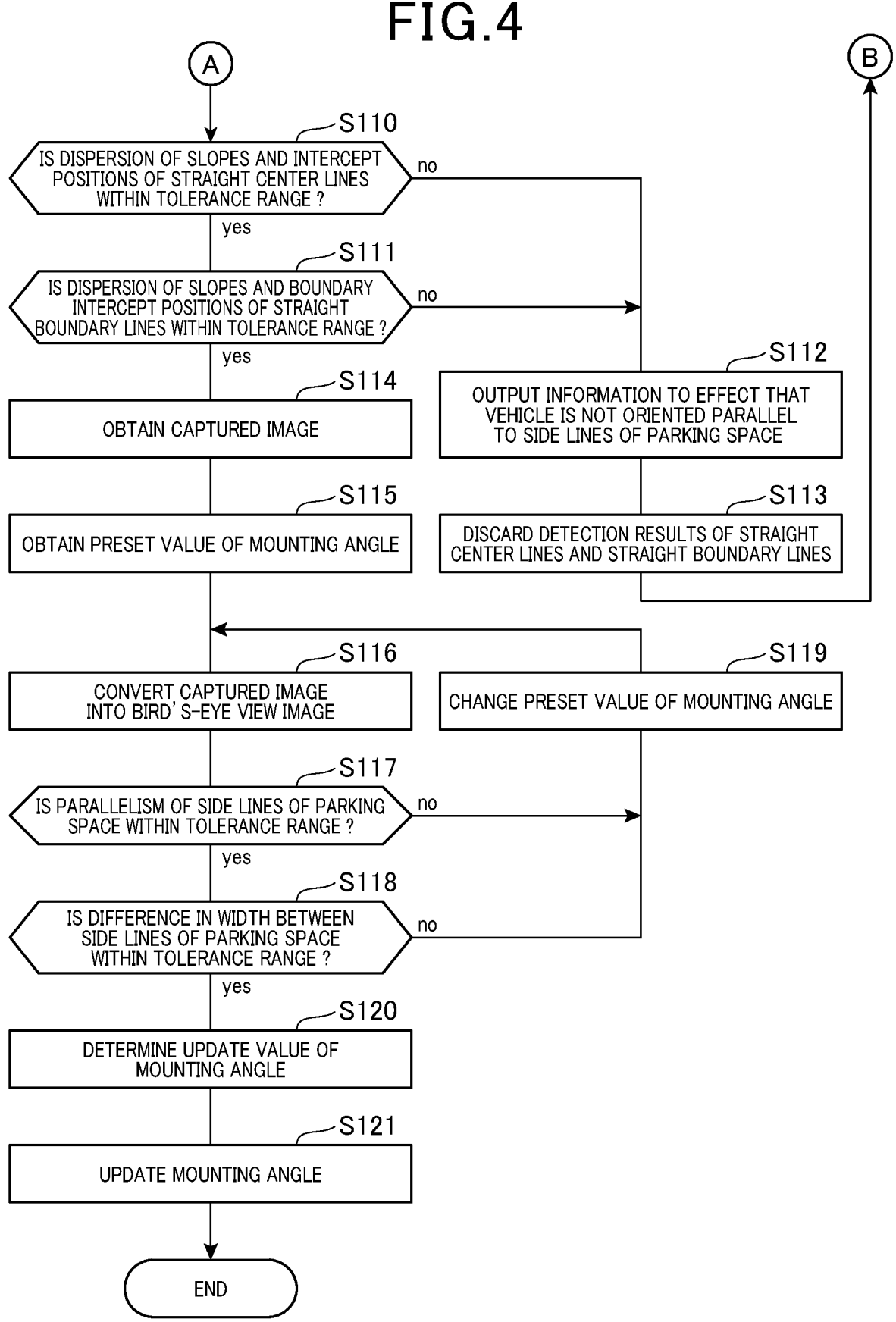
FIG. 4 is a flowchart showing a mounting angle calibration process performed by a mounting angle calibration device according to the first embodiment.

A-3. Mounting Angle Calibration Process:

FIGS. 3 and 4 exemplify a flowchart of the mounting angle calibration process performed by the mounting angle calibration device 100 according to the present embodiment. Note that the present process is performed by the CPU included in the mounting angle calibration device 100. Specifically, in the mounting angle calibration device 100, the CPU reads a program for the mounting angle calibration process from a predetermined storage region of the memory or the like (non-transitory tangible computer readable storage medium), and executes the program.

As exemplified FIG. 3, in the mounting angle calibration process according to the first embodiment, first, the mounting angle calibration device 100 provides an instruction for meeting the conditions required to calibrate the mounting angle (the conditions about the orientation of the vehicle 1 and the steering state of the steering wheel 2). Specifically, the speaker 5 and the monitor 6 are used to output an instruction to the effect that the vehicle 1 should be oriented parallel to the side lines of the parking space and furthermore the steering wheel 2 should be placed in the steering state for movement in a straight line (Step S100).

Figure 5:
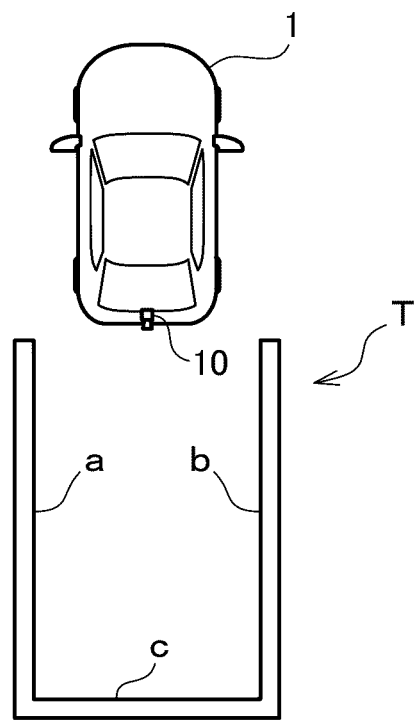
FIG. 5 shows the state where a vehicle is positioned with respect to side lines of a parking space.

For example, assume that, as exemplified in FIG. 5, a parking space T including two parallel side lines a and b equal in width and a transverse line c orthogonal to these side lines a and b is drawn on the ground. In this case, the mounting angle calibration device 100 makes the orientation of the vehicle 1 parallel to the two side lines a and b and furthermore, outputs, from the speaker 5, a sound indicating that the steering wheel 2 is to be placed in the steering state for movement in a straight line (in the state where the steering wheel 2 is upright without having been steered in either the left or right direction). Furthermore, the mounting angle calibration device 100 displays, on the monitor 6, an image showing an instruction to that effect.

In the present embodiment, the parking space T corresponds to "the target marking", and the two side lines a and b correspond to "the two straight line parts of the target marking". Furthermore, the target marking does not necessarily need to be the parking space T exemplified in FIG. 5 as long as it is a graphic having two parallel straight line parts equal in width.

By following the instruction, a driver moves the vehicle 1 so that the vehicle 1 becomes oriented parallel to the side lines a and b of the parking space T. Note that the driver does not need to make the orientation of the vehicle 1 strictly parallel to the side lines a and b of the parking space T.

Figure 6:
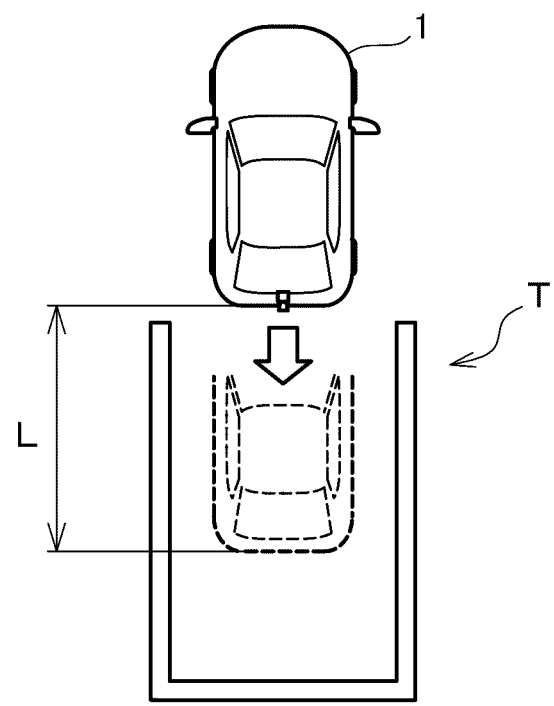
FIG. 6 shows the case of moving a vehicle in a straight line with respect to a parking space.

When outputting the instruction to the effect that the conditions about the orientation of the vehicle 1 and the steering state of the steering wheel 2 should meet the predetermined conditions, the mounting angle calibration device 100 outputs, using the speaker 5 and the monitor 6, the instruction to the effect that the vehicle 1 should be moved a predetermined distance (for example, two meters) in a straight line (Step S101 in FIG. 3). FIG. 6 exemplifies the case where the vehicle 1 is moved a predetermined distance L in a straight line with respect to the parking space T. In this way, following the instruction, the driver moves the vehicle 1 the predetermined distance L in a straight line with respect to the parking space T. Note that it is sufficient that the distance the vehicle 1 is moved in a straight line be no less than the predetermined distance L; the distance does not need to be strictly the predetermined distance L.

The mounting angle calibration device 100 obtains the captured image of the parking space T from the image generation device 20 (Step S102 in FIG. 3). At this time, the captured image obtained from the image generation device 20 is the captured image after the distortion correction (the image obtained by removing distortions due to the optical system of the in-vehicle camera 10 from the captured image).

The mounting angle calibration device 100 analyzes the captured image that has been obtained, and detects straight center lines and straight boundary lines of the side lines a and b of the parking space T. Subsequently, the mounting angle calibration device 100 stores, into a predetermined storage region (the detected straight line storage unit 104 in FIG. 2) of the memory or the like, the slopes of the detected straight center lines and straight boundary lines, the intercept positions of the detected straight center lines, and the boundary intercept positions of the detected straight boundary lines (Step S103).

Figure 7A:
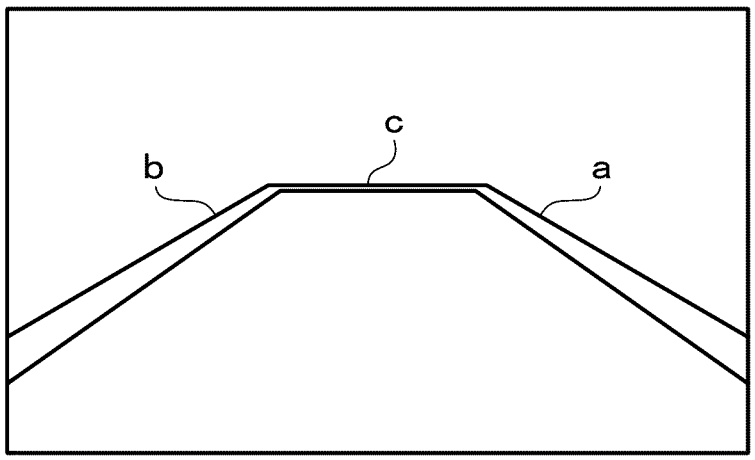
FIG. 7A shows the case of detecting straight center lines and straight boundary lines of side lines from a captured image of a parking space.
Figure 7B:
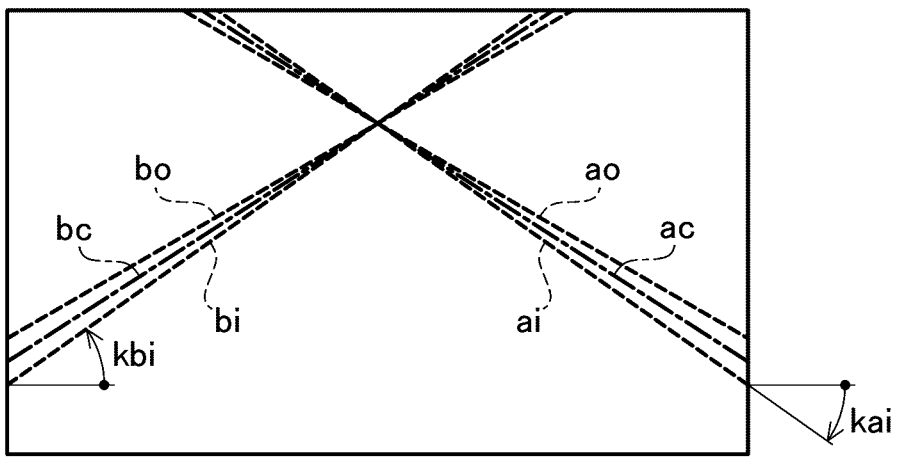
FIG. 7B shows the case of detecting straight center lines and straight boundary lines of side lines from a captured image of a parking space.
Figure 7C:
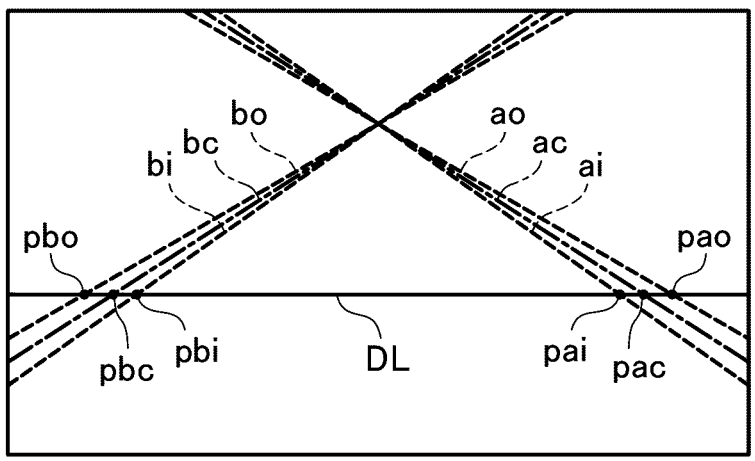
FIG. 7C shows the case of detecting straight center lines and straight boundary lines of side lines from a captured image of a parking space.

FIGS. 7A, 7B, and 7C exemplify the case of detecting the straight center lines and the straight boundary lines of the side lines a and b of the parking space T through analysis of the captured image. As exemplified in FIG. 7A, the side lines a and b of the parking space T and the transverse lines c orthogonal to the side lines a and b appear in the captured image. Since the distortions due to the optical system of the in-vehicle camera 10 have been removed from the captured image, the left and right side lines a and b are straight lines having predetermined widths in the image.

Thus, the mounting angle calibration device 100 detects a straight center line that is an extension of the center line of each of the left and right side lines a and b. FIG. 7B exemplifies a straight center line bc detected from the side line b in the captured image and a straight center line ac detected from the side line a in the captured image.

Furthermore, the mounting angle calibration device 100 detects, for each of the left and right side lines a and b, two straight boundary lines that are extensions of the inner boundary line and the outer boundary line of the parking space T. FIG. 7B exemplifies an inner straight boundary line bi, an outer straight boundary line bo, and a straight center line bc detected from the side line b in the captured image, and an inner straight boundary line ai, an outer straight boundary line ao, and a straight center line ac detected from the side line a in the captured image.

Three straight lines that are the straight center line bc, the inner straight boundary line bi, and the outer straight boundary line bo of the side line b, and three straight lines that are the straight center line ac, the inner straight boundary line ai, and the outer straight boundary line ao of the side line a are detected from one captured image. Thus, six straight lines in total are detected from one captured image.

After detecting the six straight lines, as described above, the mounting angle calibration device 100 detects the slope of each of the straight lines. FIG. 7B exemplifies the case of detecting a slope kbi of the inner straight boundary line bi detected from the side line b included in the captured image. Furthermore, FIG. 7B exemplifies the case of detecting a slope kai of the inner straight boundary line ai detected from the side line a included in the captured image. Furthermore, the mounting angle calibration device 100 detects slopes kbc, kbo, kac, and kao of the respective straight lines, namely, the straight center line bc, the straight boundary line bo, the straight center line ac, and the straight boundary line ao (not shown in the drawings).

Furthermore, the mounting angle calibration device 100 detects the intercept positions of the straight center lines bc an ac. The intercept position means the coordinate position of the point of intersection between the straight center line and a predetermined edge set in the captured image. FIG. 7C exemplifies the case of setting, in a position between the bottom and top edges of the captured image, one edge DL for testing (hereinafter referred to as "a testing edge DL") that is parallel to the bottom edge. In this case, the mounting angle calibration device 100 detects the coordinate position of the point of intersection between the testing edge DL and the straight center line bc as an intercept position pbc of the straight center line bc. The mounting angle calibration device 100 detects the coordinate position of the point of intersection between the testing edge DL and the straight center line ac as an intercept position pac of the straight center line ac.

Furthermore, the mounting angle calibration device 100 detects a boundary intercept position of each of the four straight boundary lines bo, bi, ao, and ai. The boundary intercept position means the coordinate position of the point of intersection between the straight boundary line and the predetermined testing edge DL set in the captured image. As exemplified in FIG. 7C, the mounting angle calibration device 100 detects boundary intercept positions pbo, pbi, pao, and pai of the respective straight boundary lines bo, bi, ao, and ai.

The present embodiment exemplifies the case where a straight line parallel to the bottom edge of the captured image is set as the testing edge DL, but this is not limiting. For example, the testing edge DL may be a straight line set between the left and right edges of the captured image and parallel to the left or right edge. Alternatively, any one of the top, bottom, left, and right edges of the captured image may be selected and used as the testing edge DL. As yet another example, testing edges DL separately set for the two straight center lines bc and ac and the four straight boundary lines bo, bi, ao, and ai may be used.

As described above, the mounting angle calibration device 100 performs the following processing in Step S103 in FIG. 3. Specifically, the mounting angle calibration device 100 detects the slope, intercept position, etc., of each of the two detected straight center lines. Furthermore, the mounting angle calibration device 100 detects the slope, boundary intercept position, etc., of each of the four straight boundary lines. The mounting angle calibration device 100 stores the detection results into the memory (the detected straight line storage unit 104 in FIG. 2).

The mounting angle calibration device 100 determines whether the steering wheel 2 is being maintained in the steering state for movement in a straight line (Step S104). As described above, the mounting angle calibration device 100 instructs the driver of the vehicle 1 to place the steering wheel 2 in the steering state for movement in a straight line and move the vehicle 1 in a straight line (Steps S100 and S101). Thus, in the processing in Step S104, the "yes" determination is made unless the driver turns the steering wheel 2.

When the "yes" determination is made in the processing in Step S104, the mounting angle calibration device 100 determines whether the results of the above-described detection process on a predetermined number of captured images (for example, 100 images) have been stored (Step S107). Note that in this detection process, the captured images are analyzed, and the slopes and the intercept positions of the straight center lines and the slopes and the boundary intercept positions of the straight boundary lines are detected. Subsequently, in this process, the detection results are stored into the detected straight line storage unit 104. First, only one captured image is processed. Thus, in Step S107, the "no" determination is made.

When the "no" determination is made in the processing in Step S107, the mounting angle calibration device 100 determines whether the travel distance of the vehicle 1 has reached the predetermined distance L (Step S108).

As a result, when determining that the travel distance of the vehicle 1 has not reached the predetermined distance L (Step S108: no), the mounting angle calibration device 100 obtains a captured image of the parking space T again (Step S102), and analyzes the captured image. Subsequently, the mounting angle calibration device 100 detects the slopes and the intercept positions of the straight center lines and the slopes and the boundary intercept positions of the straight boundary lines, and stores the detection results into the detected straight line storage unit 104 (Step S103).

Thus, each time one captured image is obtained, the slopes and the intercept positions of the straight center lines and the slopes and the boundary intercept positions of the straight boundary lines are accumulated in the memory in the mounting angle calibration device 100. Specifically, each time one captured image is obtained, the slopes and the intercept positions of the two straight center lines and the slopes and the boundary intercept positions of the four straight boundary lines are accumulated in the detected straight line storage unit 104. FIG. 8 schematically exemplifies the case of accumulating slopes kbc and kac and intercept positions pbc and pac of the straight center lines be and ac and slopes kbo, kbi, kao, and kai and boundary intercept positions pbo, pbi, pao, and pai of straight boundary lines bo, bi, ao, and ai in the memory in the mounting angle calibration device 100.

As described above, when the driver turns the steering wheel 2 during the period in which the detection results of the straight center lines and the straight boundary lines are accumulated, the mounting angle calibration device 100 determines that the steering wheel 2 is not maintained in the steering state for movement in a straight line (Step S104 in FIG. 3: no).

When the "no" determination is made in the processing in Step S104, the mounting angle calibration device 100 discards the detection results of the straight center lines and the straight boundary lines (the data exemplified FIG. 8) accumulated in the memory (Step S105). Subsequently, the mounting angle calibration device 100 outputs, using the speaker 5 and the monitor 6, the warning and the instruction to the effect that the steering wheel 2 should be maintained in the steering state for movement in a straight line (Step S106).

Returning to the beginning of the processing, the mounting angle calibration device 100 outputs again the instruction to the effect that the vehicle 1 should be oriented parallel to the side lines a and b of the parking space T and the steering wheel 2 should be placed in the steering state for movement in a straight line (Step S100). Afterwards, the mounting angle calibration device 100 repeats the above-described processing in Steps S102 to S108. Thus, as exemplified in FIG. 8, the detection results of the straight center lines and the straight boundary lines are accumulated in the memory in the mounting angle calibration device 100.

When determining that the travel distance of the vehicle 1 has reached the predetermined distance L (Step S108: yes) before the detection results of the predetermined number of captured images are accumulated (Step S107: no), the mounting angle calibration device 100 performs the following process. Specifically, the speaker 5 and the monitor 6 are used to output an instruction to the effect that the direction of travel of the vehicle 1 should be reversed and the vehicle 1 should be moved the predetermined distance L in a straight line (Step S109). For example, when the vehicle 1 has been backing up so far, an instruction is provided to the effect that the vehicle 1 should move forward the predetermined distance L while the steering wheel 2 is maintained in the steering state for movement in a straight line. Alternatively, when the vehicle 1 has been moving forward so far, an instruction is provided to the effect that the vehicle 1 should back up the predetermined distance L while the steering wheel 2 is maintained in the steering state for movement in a straight line.

After obtaining a captured image of the parking space T again (Step S102), the mounting angle calibration device 100 continues the process of accumulating the straight center lines and the straight boundary lines detected through the analysis of the captured image (Steps S103 to S108).

In the mounting angle calibration device 100, the straight center lines and the straight boundary lines detected from the captured images are accumulated by the repetition of such processes. Eventually, the number of captured images from which the straight center lines and the straight boundary lines have been detected and accumulated reaches the predetermined number. Thus, in the processing in Step S107, the "yes" determination is made.

When the accumulation of the straight center lines and the straight boundary lines detected from the predetermined number of captured images is completed, the mounting angle calibration device 100 can determine whether the vehicle 1 has become oriented parallel to the side lines a and b of the parking space T as instructed. Hereinafter, a method for determining the orientation of the vehicle 1 will be described. First, the fundamental concept for determining the orientation of the vehicle 1 will be described with reference to FIGS. 9A and 9B.

Figure 9A:
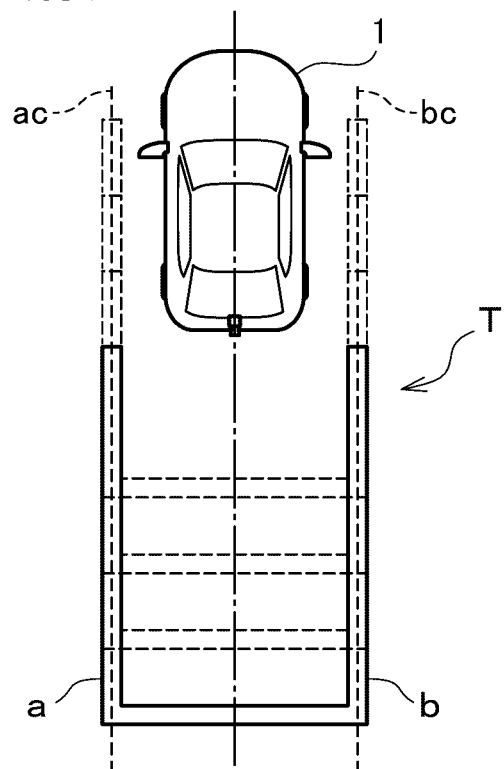
FIG. 9A shows a reason why whether a vehicle is oriented parallel to side lines can be determined by accumulation of the detection results of straight center lines and straight boundary lines of the side lines.

Assume that the orientation of the vehicle 1 is parallel to the side lines a and b of the parking space T. When the vehicle 1 moves while the steering wheel 2 is maintained in the steering state for movement in a straight line, the relative position relationship between the vehicle 1 and the parking space T changes. FIG. 9A exemplifies the relative position relationship between the vehicle 1 and the parking space T when the position of the parking space T changes relative to the position of the vehicle 1 (in the state where the position of the vehicle 1 is fixed).

As exemplified in FIG. 9A, the axis of the parking space T in the movement direction is the same as the axis of the vehicle 1 in a direction of actual movement thereof. The vehicle 1 moves in a straight line while the steering wheel 2 is maintained in the steering state for movement in a straight line. Therefore, the axis of the vehicle 1 in the direction of movement thereof is the same as the axis of the vehicle 1 in the direction in which the vehicle 1 is oriented.

The driver steers the vehicle 1 so that the vehicle 1 becomes oriented parallel to the side lines a and b of the parking space T. As a result, the axis of the parking space T in the direction of movement thereof in FIG. 9A is parallel to the two side lines a and b. In other words, the movement direction of the parking space T is the same as the two side lines a and b. Therefore, as exemplified in FIG. 9A, when the parking space T moves with respect to the vehicle 1, the side lines a and b of the parking space T move on the respective extensions of said side lines a and b.

Thus, when the orientation of the vehicle 1 is parallel to the side lines a and b of the parking space T, the straight center lines ac detected from the side lines a in the plurality of captured images obtained while the vehicle 1 moves in a straight line are the same straight line. Similarly, the straight center lines bc detected from the side lines b are the same straight line. The outer straight boundary lines ao detected from the side lines a are the same straight line, and the inner straight boundary lines ai detected from the side lines a are the same straight line. Similarly, the outer straight boundary lines bo detected from the side lines b are the same straight line, and the inner straight boundary lines bi detected from the side lines b are the same straight line.

Figure 9B:
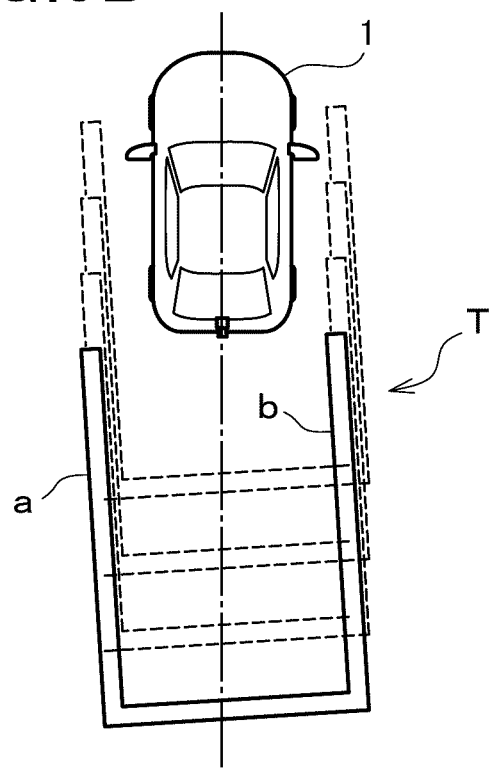
FIG. 9B shows a reason why whether a vehicle is oriented parallel to side lines can be determined by accumulation of the detection results of straight center lines and straight boundary lines of the side lines.

In contrast, assume that the orientation of the vehicle 1 is not parallel to the side lines a and b of the parking space T. FIG. 9B exemplifies the relative position relationship between the vehicle 1 and the parking space T when the position of the parking space T changes relative to the position of the vehicle 1. As exemplified in FIG. 9B, the positions of the side lines a and b with respect to the vehicle 1 change as the position of the parking space T changes.

Thus, in the case where the orientation of the vehicle 1 is not parallel to the side lines a and b of the parking space T, when the captured images are obtained while the vehicle 1 moves in a straight line, the straight center line ac detected from the side line a in each of the captured images is a different straight line. Similarly, the straight center line bc detected from the side line b in each of the captured images is a different straight line. Each of the outer straight boundary line ao and the inner straight boundary line ai detected from the side line a in each of the captured images is a different straight line, and each of the outer straight boundary line bo and the inner straight boundary line bi detected from the side line b in each of the captured images is a different straight line.

In view of the foregoing, the orientation of the vehicle 1 can be determined by the following method. Specifically, the mounting angle calibration device 100 stores, for each of the captured images, the straight center lines and straight boundary lines detected from the captured image. The mounting angle calibration device 100 determines, using straight line data stored therein, whether the straight center lines in the captured images are the same straight line. Similarly, the mounting angle calibration device 100 determines whether the straight boundary lines in the captured images are the same straight lines. As a result, when the straight lines in the captured images can be regarded as the same straight line, the mounting angle calibration device 100 determines that the orientation of the vehicle 1 is parallel to the side lines a and b of the parking space T.

In the mounting angle calibration process in FIGS. 3 and 4, such a principle is used to determine that the orientation of the vehicle 1 is parallel to the side lines a and b of the parking space T.

Specifically, this is indicated in Steps S110 and S111 in FIG. 4. First, when the accumulation of the straight center lines and the straight boundary lines detected from the predetermined number of captured images is completed (Step S107 in FIG. 3: yes), the mounting angle calibration device 100 determines whether the dispersion of the slopes and the intercept positions of the accumulated straight center lines is within a predetermined tolerance range (Step S110). In other words, when the accumulation of the straight center lines and the straight boundary lines meets a predetermined condition, the mounting angle calibration device 100 determines whether the dispersion of the slopes and the intercept positions of the accumulated straight center lines is within the predetermined tolerance range.

This determination is made as follows. As described above with reference to FIG. 8, for each of the straight center lines bc and ac, the slopes and the intercept positions of the straight center lines are accumulated. Thus, in the processing in Step S110, the slopes kbc of the straight center line bc are read, and dispersion $\sigma$kbc thereof is calculated. Furthermore, the slopes kac of the straight center line ac are read, and dispersion $\sigma$kac thereof is calculated. Similarly, in the processing in Step S110, the intercept positions pbc of the straight center line bc are read, and dispersion $\sigma$pbc thereof is calculated. Furthermore, the intercept positions pac of the straight center line ac are read, and dispersion $\sigma$pac thereof is calculated.

In the processing in Step S110, whether the calculated dispersion $\sigma$kbc, $\sigma$kac, $\sigma$pbc, and $\sigma$pac is within a predetermined tolerance range is determined. Note that the tolerance range (for example, the upper limit value and the lower limit value) is preset for each value of the calculated dispersion.

As a result, when determining that every dispersion of the slopes and the intercept positions of the straight center lines is within the predetermined tolerance range (Step S110 in FIG. 4: yes), the mounting angle calibration device 100 determines whether the dispersion of the slopes and the boundary intercept positions of the straight boundary lines is within the predetermined tolerance range (Step S111). In other words, when each of the slope and the intercept position of the straight center line is within the predetermined tolerance range, the mounting angle calibration device 100 determines whether the dispersion of the slopes and the boundary intercept positions of the accumulated straight boundary lines is within the predetermined tolerance range.

This determination is made as follows. Similar to the straight center line, as described above with reference to FIG. 8, for each of the straight boundary lines bo, bi, ao, and ai, the slopes and the boundary intercept positions of the straight boundary line are accumulated. Thus, in the processing in Step S111, the slopes kbo and kbi of the straight boundary lines bo an bi are read, and respective dispersion $\sigma$kbo and $\sigma$kbi thereof is calculated. Similarly, in the processing in Step S111, the slopes kao and kai of the straight boundary lines ao and ai are read, and respective dispersion $\sigma$kao and $\sigma$kai thereof is calculated.

Furthermore, in the processing in Step S111, the boundary intercept positions pbo, pbi, pao, and pai of the straight boundary lines bo, bi, ao, and ai are read, and respective dispersion $\sigma$pbo, $\sigma$pbi, $\sigma$pao, and $\sigma$pai thereof is calculated.

In the processing in Step S111, whether the calculated dispersion $\sigma$kbo, $\sigma$kbi, $\sigma$kao, $\sigma$kai, $\sigma$pbo, $\sigma$pbi, $\sigma$pao, and $\sigma$pai is within the predetermined tolerance range is determined.

As a result, when determining that every dispersion of the slopes and the boundary intercept positions of the straight boundary lines is within the predetermined tolerance range (Step S111 in FIG. 4: yes), the mounting angle calibration device 100 determines that the straight center lines be and ac in the captured images are the same straight line (the positions thereof on the images match). Similarly, the straight boundary lines in the captured images are determined as the same straight line. Specifically, when each of the slope and the intercept position of the straight center line is within the predetermined tolerance range and each of the slope and the intercept position of the straight boundary line is within the predetermined tolerance range, the mounting angle calibration device 100 determines that the position relationship between the vehicle 1 and the parking space T is in the state shown in FIG. 9A. Thus, in this case, the orientation of the vehicle 1 can be determined as being parallel to the side lines a and b of the parking space T.

In contrast, when determining that the dispersion of the slopes and/or the intercept positions of the straight center lines is not within the predetermined tolerance range (Step S110 in FIG. 4: no), the mounting angle calibration device 100 can determine that the orientation of the vehicle 1 is not parallel to the side lines a and b of the parking space T.

Similarly, when determining that the dispersion of the slopes and/or the boundary intercept positions of the straight boundary lines is not within the predetermined tolerance range (Step S111: no), the mounting angle calibration device 100 can determine that the orientation of the vehicle 1 is not parallel to the side lines a and b of the parking space T.

As described above, when the "no" determination is made in the processing in Step S110 or Step S111, the mounting angle calibration device 100 outputs, using the speaker 5 and the monitor 6, information to the effect that the orientation of the vehicle 1 is not parallel to the side lines a and b of the parking space T (Step S112). The mounting angle calibration device 100 discards the detection results of the straight center lines and the straight boundary lines (the data exemplified in FIG. 8) accumulated in the memory (Step S113). Furthermore, returning to the beginning of the processing, the mounting angle calibration device 100 performs the above-described processing in Step S100 in FIG. 3 to Step S111 in FIG. 4.

As described above, in the present embodiment, when the following two conditions are met, the orientation of the vehicle 1 is determined as being parallel to the side lines a and b of the parking space T. One of the conditions, i.e., the first condition, is that the dispersion of the slopes and the intercept positions of the straight center lines is within the predetermined tolerance range. The other of the conditions, i.e., the second condition, is that the dispersion of the slopes and the boundary intercept positions of the straight boundary lines is within the predetermined tolerance range. However, when any one of the abovementioned first condition and the abovementioned second condition is met, the mounting angle calibration device 100 may determine that the orientation of the vehicle 1 is parallel to the side lines a and b of the parking space T.

For example, when the dispersion of the slopes and the intercept positions of the straight center lines is within the predetermined tolerance range, the mounting angle calibration device 100 can determine that the orientation of the vehicle 1 is parallel to the side lines a and b of the parking space T. Thus, it is sufficient that the mounting angle calibration device 100 accumulate the slopes and the intercept positions of the straight center lines; the mounting angle calibration device 100 does not need to accumulate the slopes and the boundary intercept positions of the straight boundary lines.

When the dispersion of the slopes and the boundary intercept positions of the straight boundary lines is within the predetermined tolerance range, the mounting angle calibration device 100 can determine that the orientation of the vehicle 1 is parallel to the side lines a and b of the parking space T. Thus, it is sufficient that the mounting angle calibration device 100 accumulate the slopes and the boundary intercept positions of the straight boundary lines; the mounting angle calibration device 100 does not need to accumulate the slopes and the intercept positions of the straight center lines.

When the mounting angle calibration device 100 successfully confirmed by the method described above that the orientation of the vehicle 1 is parallel to the side lines a and b of the parking space T (Step S111 in FIG. 4: yes), the mounting angle calibration device 100 obtains the captured image (Step S114). The captured image obtained at this time may be a new one obtained from the image generation device 20. Alternatively, among a predetermined number of captured images obtained for accumulating the straight center lines and the straight boundary lines, a captured image last obtained from the image generation device 20 may be used.

The mounting angle calibration device 100 obtains the preset value of the mounting angle of the in-vehicle camera 10 stored in the storage unit 21 in the image generation device 20 (Step S115 in FIG. 4). As described above, the image generation device 20 has a function of converting an image captured by the in-vehicle camera 10 into a bird's-eye view image and outputting the bird's-eye view image to the monitor 6. In order to convert the image captured by the in-vehicle camera 10 into a bird's-eye view image, the value of the mounting angle of the in-vehicle camera 10 is necessary. Therefore, the preset value of the mounting angle of the in-vehicle camera 10 is stored in the storage unit 21 in the image generation device 20. Thus, in the processing in Step S115, this preset value of the mounting angle is obtained from the image generation device 20.

The mounting angle calibration device 100 converts, into a bird's-eye view image, the captured image that has been obtained (Step S116 in FIG. 4). The mounting angle of the in-vehicle camera 10 used in the bird's-eye view conversion at this time is the preset value of the mounting angle obtained from the image generation device 20.

The mounting angle calibration device 100 determines, through the analysis of the obtained bird's-eye view image, whether the parallelism of the side lines a and b of the parking space T appearing in the bird's-eye view image is within the predetermined tolerance range (Step S117).

Figure 10A:
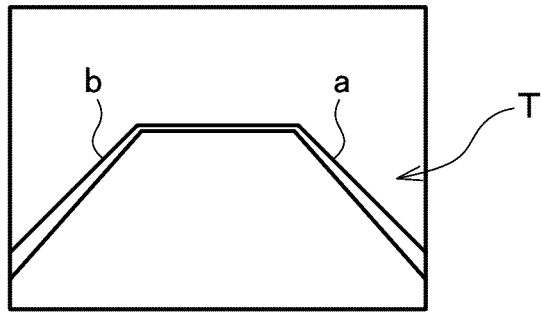
FIG. 10A shows the case of searching for a mounting angle of an in-vehicle camera, focusing on the parallelism of two side lines detected from a parking space and a difference in width between the two side lines in a bird's-eye view image.
Figure 10B:
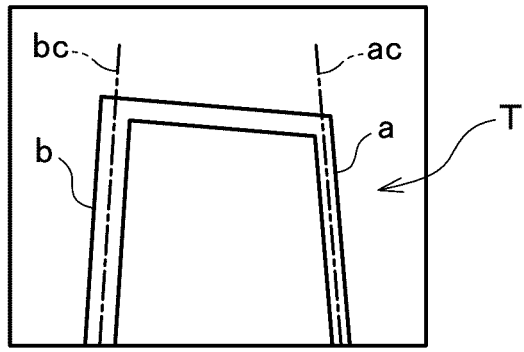
FIG. 10B shows the case of searching for a mounting angle of an in-vehicle camera, focusing on the parallelism of two side lines detected from a parking space and a difference in width between the two side lines in a bird's-eye view image.

For example, assume that the captured image is the image shown in FIG. 10A. Furthermore, assume that the bird's-eye view image shown in FIG. 10B is obtained through the bird's-eye view conversion of the captured image. As exemplified in FIG. 10B, the parking space T in the bird's-eye view image has a distorted shape. If the mounting angle of the in-vehicle camera 10 used in the bird's-eye view conversion is correct, the parking space T in the bird's-eye view image obtained at this time has an actual shape of the parking space T (a shape including the two side lines a and b parallel to each other and equal in width). Therefore, the fact that the parking space T in the bird's-eye view image has a distorted shape means that the mounting angle of the in-vehicle camera 10 used in the bird's-eye view conversion is different from the actual mounting angle.

Thus, in the processing in Step S117 in FIG. 4, the bird's-eye view image is analyzed, the side lines a and b of the parking space T are detected, and the straight center line bc of the side line b and the straight center line ac of the side line a are detected. Furthermore, in the processing in Step S117, whether the parallelism of the straight center line bc of the side line b and the straight center line ac of the side line a is within the predetermined tolerance range. Note that the tolerance range (for example, the upper limit value and the lower limit value) is preset.

As a result, when determining that the parallelism of the straight center line be of the side line b and the straight center line ac of the side line a is not within the predetermined tolerance range (Step S117 in FIG. 4: no), the mounting angle calibration device 100 determines that the parking space T in the bird's-eye view image has a distorted shape and the mounting angle of the in-vehicle camera 10 used in the bird's-eye view conversion is not correct.

The mounting angle calibration device 100 changes the preset value of the mounting angle (Step S119), and converts the captured image into a bird's-eye view image again using the mounting angle after the change (Step S116). Subsequently, through the analysis of the obtained bird's-eye view image, the mounting angle calibration device 100 detects the straight center lines of the side lines a and b of the parking space T in the bird's-eye view image, and determines whether the parallelism of the detected straight center lines is within the predetermined tolerance range (Step S117).

Although details will be described later, the mounting angle of the in-vehicle camera 10 includes the following angles. Specifically, the mounting angle includes a mounting angle in the pitch direction (hereinafter referred to as "a pitch-direction angle θp"), a mounting angle in the yaw direction (hereinafter referred to as "a yaw-direction angle θy"), and a mounting angle in the roll direction (hereinafter referred to as "a roll-direction angle θr"). The pitch direction is a direction in which the angle of the optical axis of the in-vehicle camera 10 vertically changes with respect to the vehicle 1. The yaw direction is a direction in which the angle of the optical axis of the in-vehicle camera 10 horizontally changes with respect to the vehicle 1. The roll direction is a direction in which the in-vehicle camera 10 rotates centrally about the optical axis.

In the processing in Step 119 which is performed after the "no" determination is made in the processing in Step S117 in FIG. 4, it is preferable that the preset values of the pitch-direction angle θp and the yaw-direction angle θy be mainly changed to change the preset value of the mounting angle of the in-vehicle camera 10.

Figure 10C:
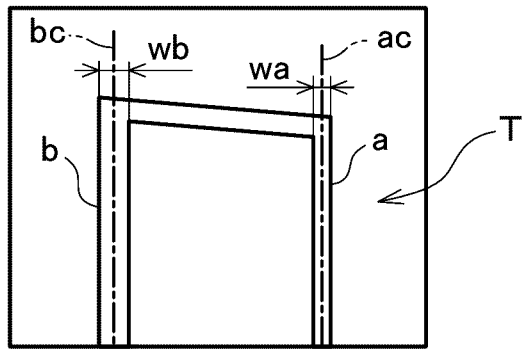
FIG. 10C shows the case of searching for a mounting angle of an in-vehicle camera, focusing on the parallelism of two side lines detected from a parking space and a difference in width between the two side lines in a bird's-eye view image.

As described above, the mounting angle calibration device 100 changes the mounting angle of the in-vehicle camera 10 and repeats the bird's-eye view conversion of the captured image until the predetermined condition is met (Steps S119 and S116 in FIG. 4). Assume that the bird's-eye view image shown in FIG. 10C is consequently obtained, for example. As exemplified in FIG. 10C, the side lines a and b of the parking space Tin the bird's-eye view image are parallel, but the parking space T has a distorted shape. Furthermore, the width wb of the side line b is greater than the width wa of the side line a; the side line b and the side line a are not equal in width ("wb>wa" in FIG. 10C). Therefore, even when the parallelism of the two side lines a and b is within the predetermined tolerance range, it is not possible to determine that the mounting angle of the in-vehicle camera 10 is correct on the basis of this result.

Thus, when determining that the parallelism of the side lines a and b of the parking space T is within the predetermined tolerance range (Step S117 in FIG. 4: yes), the mounting angle calibration device 100 detects the width wb of the side line b and the width wa of the side line a, and determines whether the difference in width therebetween is within a predetermined tolerance range (Step S118).

As a result, when determining that the difference in width between the two side lines a and b is not within the predetermined tolerance range (Step S118 in FIG. 4: no), the mounting angle calibration device 100 determines that the mounting angle of the in-vehicle camera 10 used in the bird's-eye view conversion is not correct, and changes the preset value of the mounting angle again (Step S119). The mounting angle calibration device 100 converts the captured image into a bird's-eye view image again using the mounting angle after the change (Step S116). Subsequently, the mounting angle calibration device 100 analyzes the obtained bird's-eye view image, detects the side lines a and b of the parking space T in the bird's-eye view image, and determines whether the parallelism of the detected side lines a and b is within the predetermined tolerance range and whether the difference in width between the detected side lines a and b is within the predetermined tolerance range (Step S117 and Step S118).

In the processing in Step 119 which is performed after the "no" determination is made in the processing in Step S118, it is preferable that the preset value of the roll-direction angle θr be mainly changed to change the preset value of the mounting angle of the in-vehicle camera 10.

Figure 10D:
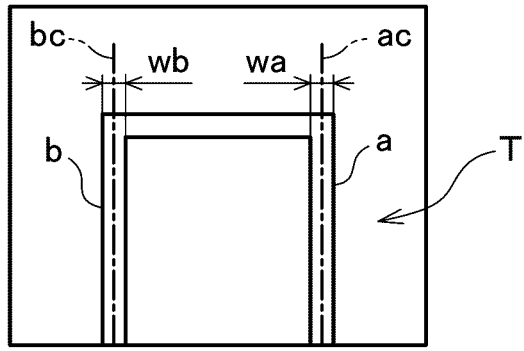
FIG. 10D shows the case of searching for a mounting angle of an in-vehicle camera, focusing on the parallelism of two side lines detected from a parking space and a difference in width between the two side lines in a bird's-eye view image.

As described above, the mounting angle calibration device 100 changes the mounting angle of the in-vehicle camera 10 and repeats the bird's-eye view conversion of the captured image until the predetermined condition is met (Steps S119 and S116 in FIG. 4). Assume that the bird's-eye view image shown in FIG. 10D is consequently obtained, for example. In the bird's-eye view image shown in FIG. 10D, the side lines a and b of the parking space T are parallel. Furthermore, the width wb of the side line b and the width wa of the side line a are equal ("wb=wa" in FIG. 10D. Thus, the parking space T is determined as not being distorted in shape. This determination result means that the mounting angle of the in-vehicle camera 10 used in the bird's-eye view conversion is correct (the actual mounting angle of the in-vehicle camera 10 with respect to the vehicle 1).

Thus, when a bird's-eye view image is obtained in which the parallelism of the side lines a and b of the parking space T is within the predetermined tolerance range and the difference in width between the side lines a and b of the parking space T is within the predetermined tolerance range (Step S117: yes and Step S118: yes), the mounting angle calibration device 100 determines, as an update value of the mounting angle (a correct value of the mounting angle), the value of the mounting angle used in the bird's-eye view conversion at that time (Step S120).

The mounting angle calibration device 100 writes the determined update value of the mounting angle in the storage unit 21 in the image generation device 20, thereby updating the preset value of the mounting angle stored in the storage unit 21 (Step S121 in FIG. 4). Then, the mounting angle calibration process shown in FIGS. 3 and 4 is brought to an end.

Note that in the above-described mounting angle calibration process, the processing from Step S100 in FIG. 3 to Step S120 in FIG. 4 corresponds to a mounting angle detection process for detecting a mounting angle of the in-vehicle camera 10.

As described in detail, in the mounting angle calibration device 100 (mounting angle calibration process) including the mounting angle detection device 120 according to the present embodiment, before the captured image is converted into a bird's-eye view image and a correct mounting angle is retrieved by the search (before the processing from Step S116 to Step S119 in FIG. 4 is performed), it is confirmed that the orientation of the vehicle 1 is parallel to the side lines a and b of the parking space T (Step S110: yes and Step S111: yes). Thus, the mounting angle calibration device 100 according to the present embodiment can easily detect a correct mounting angle of the in-vehicle camera 10 with respect to the vehicle 1. The following is a supplemental description of this point.

As described above, in the mounting angle calibration process, the captured image such as that shown in FIG. 10A is converted into a bird's-eye view image, and the mounting angle of the in-vehicle camera 10 is searched for until a bird's-eye view image including the parking space T having a shape with no distortion such as that shown in FIG. 10D is obtained.

The mounting angle obtained in this way is the angle of the optical axis of the in-vehicle camera 10 with respect to the side lines a and b of the parking space T. For example, assume that as exemplified in FIG. 11, the optical axis CL of the in-vehicle camera 10 is inclined at an angle θ in the yaw direction with respect to the side lines a and b of the parking space T. At this time, if the captured image is converted into a bird's-eye view image on an assumption that the optical axis CL of the in-vehicle camera 10 is not inclined, the shape of the parking space T is distorted. Thus, in the mounting angle calibration process, the angle in the yaw direction is changed so that a bird's-eye view image including the parking space T having a shape with no distortion can be obtained. In this way, the angle θ is retrieved by the search in the mounting angle calibration process.

Figure 11:
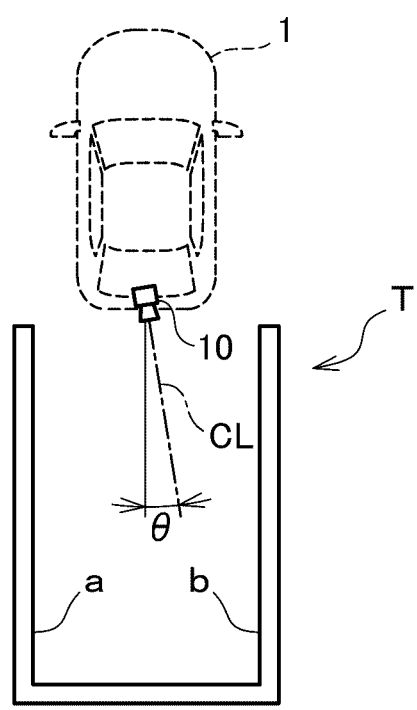
FIG. 11 shows a reason for checking, before searching for a mounting angle of an in-vehicle camera, that the orientation of a vehicle is parallel to side lines of a parking space.

However, the angle θ retrieved by the search in this way is an angle at which the optical axis CL of the in-vehicle camera 10 is inclined with respect the side lines a and b of the parking space T. Therefore, this is irrelevant to the angle at which the in-vehicle camera 10 is mounted on the vehicle 1. Specifically, even when the angle of the optical axis CL of the in-vehicle camera 10 with respect to the side lines a and b of the parking space T is known, if the angle of the axis of the vehicle 1 in the direction in which the vehicle 1 is oriented with respect to the side lines a and b of the parking space T is not known, the mounting angle of the in-vehicle camera 10 with respect to the vehicle 1 cannot be calculated. In FIG. 11, the reason why the vehicle 1 is shown with dashed lines is because the orientation of the vehicle 1 has not been fixed.

Assume that it is guaranteed that the orientation of the vehicle 1 is parallel to the side lines a and b of the parking space T. In this case, the orientation of the vehicle 1 and the orientation of the side lines a and b of the parking space T are the same. Therefore, the angle of the optical axis CL of the in-vehicle camera 10 with respect to the side lines a and b of the parking space T can be directly interpreted as the angle of the vehicle 1 (the mounting angle of the in-vehicle camera 10 with respect to the vehicle 1). Therefore, the mounting angle of the in-vehicle camera 10 with respect to the vehicle 1 can be easily detected.

For this reason, in the above-described mounting angle calibration process, the captured image is converted into a bird's-eye view image after it is confirmed that the orientation of the vehicle 1 is parallel to the side lines a and b of the parking space T (S111 in FIG. 4: yes). Subsequently, a correct mounting angle of the in-vehicle camera 10 with respect to the vehicle 1 is retrieved by the search (Steps S116 to S119).

Furthermore, the above-described mounting angle calibration process relies on the premise that the mounting angle of the in-vehicle camera 10 can be changed and the captured image can be converted into a bird's-eye view image on the basis of the mounting angle (various mounting angles) after the change. The reason why this process (bird's-eye view conversion) is possible will be described below.

First, various coordinate systems used to convert the captured image into a bird's-eye view image will be described.

FIG. 12 exemplifies various coordinate systems used in the bird's-eye view conversion. Coordinate systems used in the bird's-eye view conversion according to the present embodiment include, for example, an orthogonal coordinate system based on the vehicle 1 and an orthogonal coordinate system based on the in-vehicle camera 10. The orthogonal coordinate system based on the vehicle 1 is expressed using a coordinate axis Xo (hereinafter referred to as "Xo axis"), a coordinate axis Yo (hereinafter referred to as "Yo axis"), and a coordinate axis Zo (hereinafter referred to as "Zo axis"). The Xo axis is a coordinate axis of the vehicle 1 which is at a right angle to the front-and-back direction and extends in the horizontal direction. The Yo axis is a coordinate axis of the vehicle 1 which extends in the front-and-back direction. The Zo axis is a coordinate axis of the vehicle 1 which is at a right angle to the front-and-back direction and extends in the vertical direction. Hereinafter, coordinates in the orthogonal coordinate system based on the vehicle 1 will be referred to as "vehicle-based coordinates", and a coordinate value of the vehicle-based coordinates will be expressed as (xo, yo, zo).

The orthogonal coordinate system based on the in-vehicle camera 10 is expressed using a coordinate axis CX (hereinafter referred to as "CX axis"), a coordinate axis CY (hereinafter referred to as "CY axis"), and a coordinate axis CZ (hereinafter referred to as "CZ axis"). The CY axis is a coordinate axis which extends along the optical axis of the in-vehicle camera 10. The CX axis is a coordinate axis which is at a right angle to the CY axis and extends in the horizontal direction. The CZ axis is a coordinate axis which is at a right angle to each of the CY axis and the CX axis and extends upward. Hereinafter, coordinates in the orthogonal coordinate system based on the in-vehicle camera 10 will be referred to as "camera-based coordinates", and a coordinate value of the camera-based coordinates will be expressed as (cx, cy, cz).

The relationship between the vehicle-based coordinates (xo, yo, zo) and the camera-based coordinates (cx, cy, cz) changes according to the mounting position of the in-vehicle camera 10 with respect to the vehicle 1. Thus, in the present embodiment, the following new orthogonal coordinate system is assumed in order to facilitate the bird's-eye view conversion. Specifically, the new orthogonal coordinate system is an orthogonal coordinate system obtained by translation of the orthogonal coordinate system based on the vehicle 1 so that the origin O of the orthogonal coordinate system based on the vehicle 1 matches the origin CO of the orthogonal coordinate system based on the in-vehicle camera 10. The coordinate axes of this new orthogonal coordinate system include: a coordinate axis parallel to the Xo axis as the X axis; a coordinate axis parallel to the Yo axis as the Y axis; and a coordinate axis parallel to the Zo axis as the Z axis. Hereinafter, coordinates in this new orthogonal coordinate system will be referred to as "analytical vehicle-based coordinates", and a coordinate value of the analytical vehicle-based coordinates will be expressed as (x, y, z).

In such analytical vehicle-based coordinates, the rotation of the in-vehicle camera 10 in the pitch direction corresponds to the rotation about the X axis; the rotation of the in-vehicle camera 10 in the roll direction corresponds to the rotation about the Y axis; and the rotation of the in-vehicle camera 10 in the yaw direction corresponds to the rotation about the Z axis.

Furthermore, the coordinate value (xo, yo, zo) of the vehicle-based coordinates and the coordinate value (x, y, z) of the analytical vehicle-based coordinates are easily convertible according to Equation (1) shown in FIG. 13. Note that [tx, ty, tz] in Equation (1) indicates the xo coordinate, the yo coordinate, and the zo coordinate of the vehicle-based coordinates at which the origin CO of the camera-based coordinates is located.

In this way, the coordinate value (xo, yo, zo) of the vehicle-based coordinates and the coordinate value (x, y, z) of the analytical vehicle-based coordinates are mutually convertible. For analysis, the coordinate value (x, y, z) of the analytical vehicle-based coordinates is mainly used.

The coordinate value (x, y, z) of the analytical vehicle-based coordinates and the coordinate value (cx, cy, cz) of the camera-based coordinates are associated according to Equation (2) shown in FIG. 14. Note that in Equation (2): [P] represents a rotation matrix for rotating the analytical vehicle-based coordinates in the pitch direction; [R] represents a rotation matrix for rotating the analytical vehicle-based coordinates in the roll direction; and [Y] represents a rotation matrix for rotating the analytical vehicle-based coordinates in the yaw direction. The angle θp in the rotation matrix [P] is the angle of rotation, in the pitch direction, of the camera-based coordinates with respect to the analytical vehicle-based coordinates. The angle θr in the rotation matrix [R] is the angle of rotation, in the roll direction, of the camera-based coordinates with respect to the analytical vehicle-based coordinates. The angle θy in the rotation matrix [Y] is the angle of rotation, in the yaw direction, of the camera-based coordinates with respect to the analytical vehicle-based coordinates.

The coordinate value (x, y, z) of the analytical vehicle-based coordinates for the parking space T drawn on the ground is converted into the coordinate value (cx, cy, cz) of the camera-based coordinates according to Equation (2) shown in FIG. 14.

The coordinate value (cx, cy, cz) of the parking space T resulting from the conversion into the camera-based coordinates can be converted into a coordinate value of the captured image. Hereinafter, the coordinate value of the captured image will be referred to as "image plane coordinates", and a coordinate value of the image plane coordinates will be expressed as (u, v).

FIG. 15 exemplifies a method for converting, into the coordinate value (u, v) of the image plane coordinates, the coordinate value (cx, cy, cz) of the parking space T resulting from the conversion into the camera-based coordinates. As exemplified in FIG. 15, in the present conversion process, a plane orthogonal to the optical axis (the coordinate axis CY) of the in-vehicle camera 10 (hereinafter referred to as "an image plane") is set at an appropriate distance SL away from the origin CO of the camera-based coordinates. Thus, the image captured by the in-vehicle camera 10 can be regarded as an image obtained by projecting, on the image plane, a shooting subject in the camera-based coordinates.

Thus, in the present conversion process, a coordinate space is assumed which includes: a coordinate axis U parallel to the coordinate axis CX of the camera-based coordinates; and a coordinate axis V parallel to the coordinate axis CZ of the camera-based coordinates, where the origin is at the point of intersection between the image plane and the coordinate axis CY of the camera-based coordinates. In this case, the coordinate value (cx, cy, cz) of the parking space T drawn on the ground can be converted into the coordinate value (u, v) on the image plane according to Equation (3) shown in FIG. 15.

Figure 16:
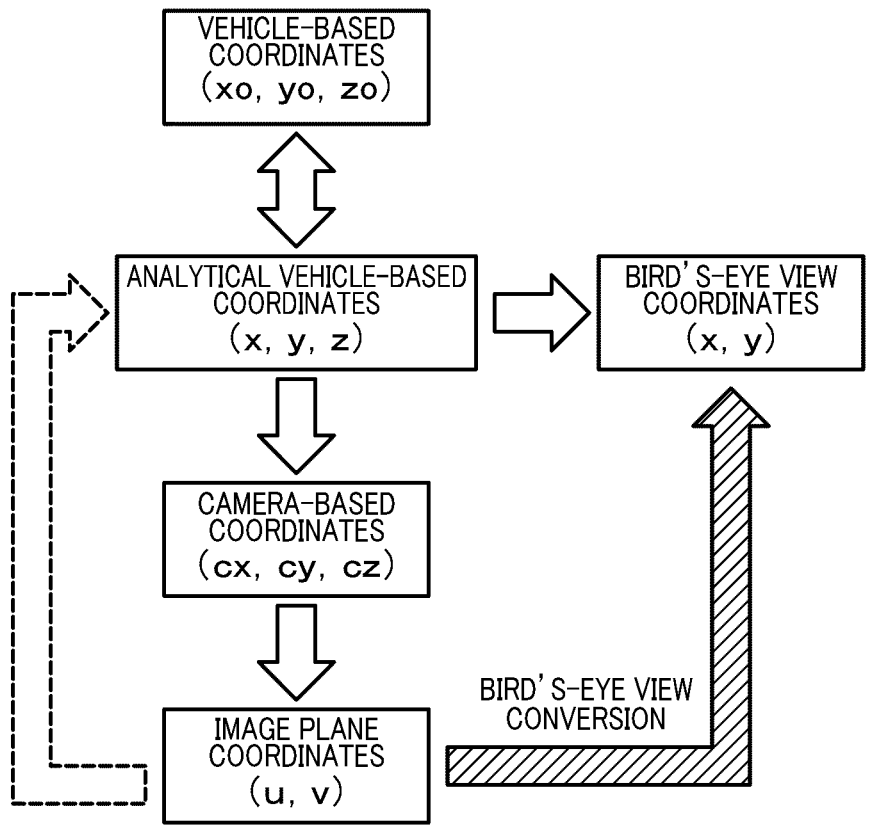
FIG. 16 shows bird's-eye view conversion.

FIG. 16 exemplifies the conversion relationship of the coordinate values described above and the conversion relationship of the coordinate values for the bird's-eye view conversion. Specifically, the coordinate value (xo, yo, zo) of the vehicle-based coordinates and the coordinate value (x, y, z) of the analytical vehicle-based coordinates are mutually convertible according to Equation (1) shown in FIG. 13. The coordinate value (x, y, z) of the analytical vehicle-based coordinates can be converted into the coordinate value (cx, cy, cz) of the camera-based coordinates according to Equation (2) shown in FIG. 14. The coordinate value (cx, cy, cz) of the camera-based coordinates can be converted into the coordinate value (u, v) of the image plane coordinates according to Equation (3) shown in FIG. 15. The coordinate value (u, v) of the image plane coordinates corresponds to the coordinate value of the captured image.

Thus, the coordinate value (x, y, z) of the analytical vehicle-based coordinates and the coordinate value (u, v) of the image plane coordinates have a one-to-one relationship. Therefore, as indicated by the dashed arrow in FIG. 16, in the present conversion process, the coordinate value (u, v) of the image plane coordinates can be inversely converted into the coordinate value (x, y, z) of the analytical vehicle-based coordinates. The bird's-eye view image is an image viewed from a predetermined height (above) along the Z axis of the analytical vehicle-based coordinates. Thus, the bird's-eye view image is obtained by deleting the Z-axis component from the coordinate value (x, y, z) of the analytical vehicle-based coordinates.

In view of the foregoing, as the bird's-eye view conversion, it is sufficient to perform a series of conversion processes in which the coordinate value (u, v) of the image plane coordinates is inversely converted into the coordinate value (x, y, z) of the analytical vehicle-based coordinates and the Z-axis component is deleted from the obtained coordinate value (x, y, z) of the analytical vehicle-based coordinates. The bird's-eye view conversion can be performed, for example, by a bird's-eye view conversion module including modules that perform these processes. Hereinafter, the coordinate value (x, y) obtained by deleting the Z-axis component from the coordinate value (x, y, z) of the analytical vehicle-based coordinates will be expressed as the coordinate value (x, y) of bird's-eye view coordinates which are a coordinate system after the bird's-eye view conversion.

As indicated in Equation (2) in FIG. 14, the conversion from the coordinate value (x, y, z) of the analytical vehicle-based coordinates into the coordinate value (cx, cy, cz) of the camera-based coordinate depends on the angle θp of the in-vehicle camera 10 in the pitch direction, the angle θr of the in-vehicle camera 10 in the roll direction, and the angle θy of the in-vehicle camera 10 in the yaw direction. Accordingly, the conversion from the image plane coordinate (u, v) of the captured image into the coordinate value (x, y) of the bird's-eye view coordinates depend on the angle θp of the in-vehicle camera 10 in the pitch direction, the angle Or of the in-vehicle camera 10 in the roll direction, and the angle θy of the in-vehicle camera 10 in the yaw direction.

Figure 17:
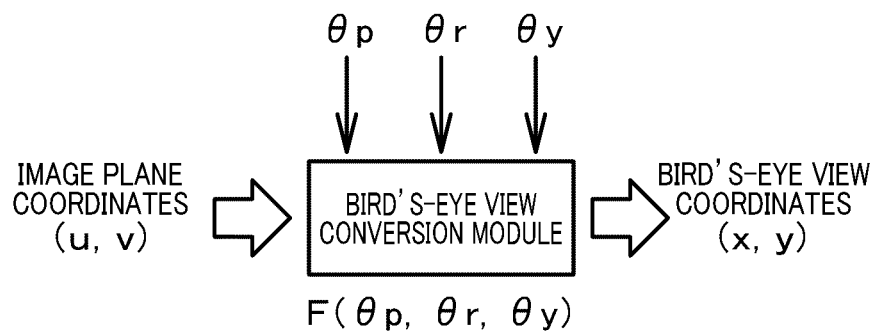
FIG. 17 shows the case of performing bird's-eye view conversion of a captured image while changing the angle of an in-vehicle camera with respect to a parking space.

Thus, as exemplified in FIG. 17, the bird's-eye view conversion module is designed to be able to set the angle θp of the in-vehicle camera 10 in the pitch direction, the angle θr of the in-vehicle camera 10 in the roll direction, and the angle θy of the in-vehicle camera 10 in the yaw direction.

In the processing in Step S116 in the mounting angle adjustment process shown in FIG. 4, the captured image is converted into a bird's-eye view image using such a bird's-eye view conversion module.

The foregoing describes the case where the parking space T has two side lines a and b and a transverse line c orthogonal to these side lines a and b (refer to FIG. 5). However, in the mounting angle calibration process shown in FIGS. 3 and 4, although the processing is performed using the side lines a and b of the parking space T, the transverse line c of the parking space T is not used. Thus, in the mounting angle calibration process according to the present embodiment, even when the parking space T does not have the transverse line c, the mounting angle of the in-vehicle camera 10 can be detected and calibrated to a correct mounting angle.

Figure 18A:
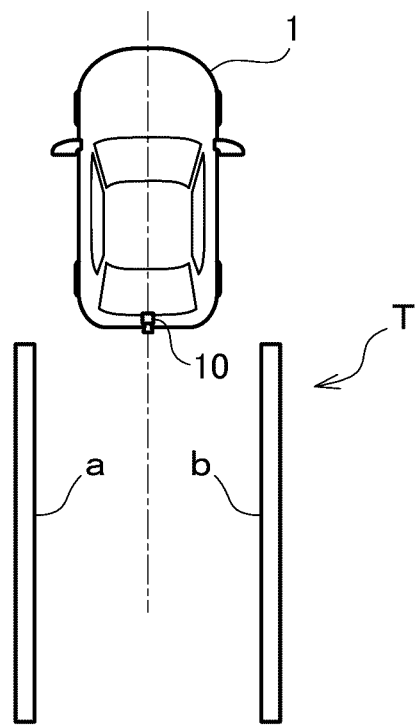
FIG. 18A indicates that the mounting angle of an in-vehicle camera can be calibrated even with a parking space having no transverse lines crossing two side lines.
Figure 18B:
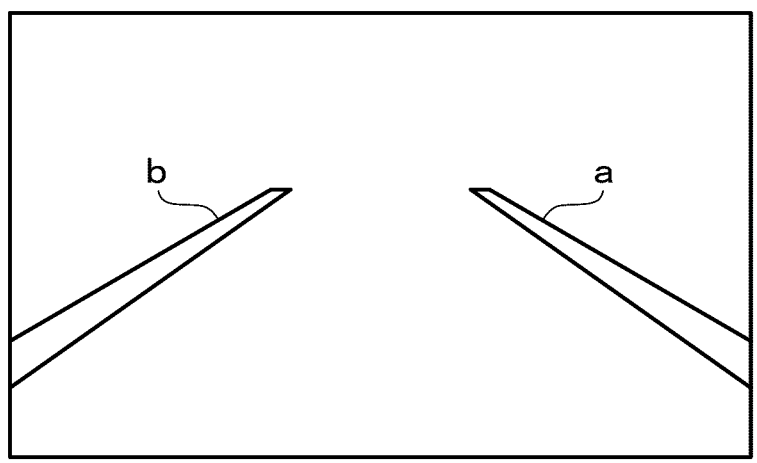
FIG. 18B indicates that the mounting angle of an in-vehicle camera can be calibrated even with a parking space having no transverse lines crossing two side lines.

When the parking space T does not have the transverse line c as exemplified in FIG. 18A, a captured image such as that exemplified in FIG. 18B is obtained. Even in this case, when the two side lines a and b can be detected, the mounting angle calibration device 100 according to the present embodiment performs the above-described mounting angle calibration process. Thus, the mounting angle of the in-vehicle camera 10 can be appropriately calibrated.

B. Second Embodiment

In the first embodiment, a configuration has been described in which the captured image obtained from the image generation device 20 is converted into a bird's-eye view image and the side lines a and b of the parking space T are detected from the obtained bird's-eye view image.

As described above, in the mounting angle calibration process according to the first embodiment, the straight center lines and the straight boundary lines of the side lines a and b detected from the plurality of captured images are accumulated before the captured images are converted into bird's-eye view images. With this, it is confirmed in the mounting angle calibration process that the orientation of the vehicle 1 is parallel to the side lines a and b of the parking space T.

In the present embodiment, instead of the bird's-eye view conversion of the captured image obtained from the image generation device 20, an image for bird's-eye view conversion is generated using the accumulated straight center lines and straight boundary lines. Hereinafter, the present embodiment will be described focusing on differences from the first embodiment.

B-1. Internal Structure of Mounting Angle Calibration Device 200

Figure 19:
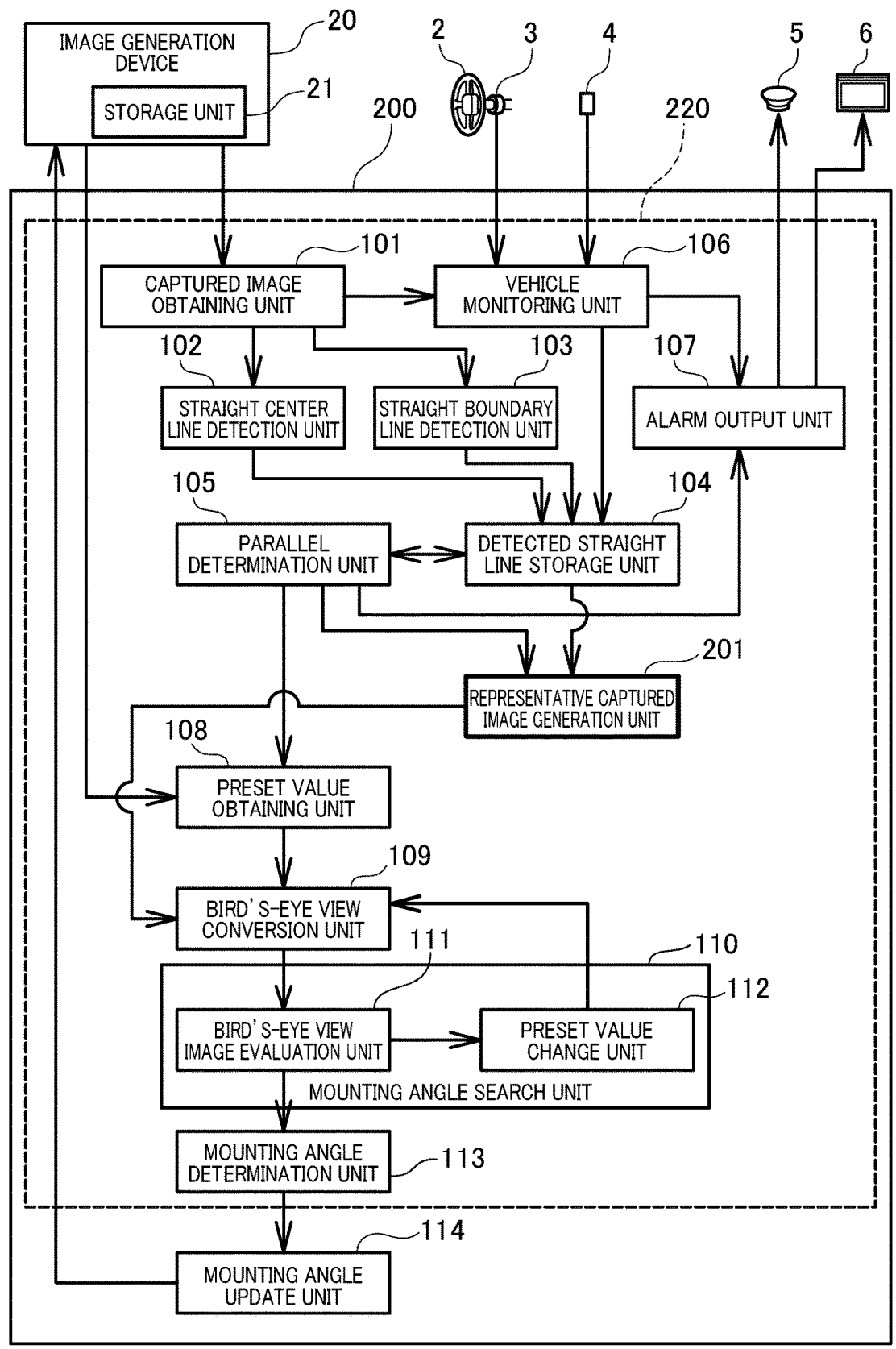
FIG. 19 is a block diagram showing the internal structure of a mounting angle calibration device according to the second embodiment.

FIG. 19 exemplifies a block diagram showing the internal structure of a mounting angle calibration device 200 according to the present embodiment. The mounting angle calibration device 200 according to the present embodiment is different from the mounting angle calibration device 100 according to the first embodiment in that a representative captured image generation unit 201 is included. Thus, the mounting angle calibration device 200 is different in that the bird's-eye view conversion unit 109 obtains an image subject to the bird's-eye view conversion from the representative captured image generation unit 201 instead of the captured image obtaining unit 101. Focusing on these differences, the internal structure of the mounting angle calibration device 200 according to the present embodiment will be briefly described below.

As exemplified in FIG. 19, as in the first embodiment, the mounting angle calibration device 200 according to the present embodiment includes a captured image obtaining unit 101, a straight center line detection unit 102, a straight boundary line detection unit 103, a detected straight line storage unit 104, a parallel determination unit 105, a vehicle monitoring unit 106, and an alarm output unit 107. Furthermore, the mounting angle calibration device 200 includes: a preset value obtaining unit 108; a bird's-eye view conversion unit 109; a mounting angle search unit 110 including a bird's-eye view image evaluation unit 111 and a preset value change unit 112; a mounting angle determination unit 113; and a mounting angle update unit 114. In addition to these, the representative captured image generation unit 201 is included in the mounting angle calibration device 200.

Note that the portion of the mounting angle calibration device 200 that excludes the mounting angle update unit 114 (the portion enclosed by the dashed line in FIG. 19) corresponds to a mounting angle detection device 220 according to the present embodiment.

The captured image obtaining unit 101, the straight center line detection unit 102, the straight boundary line detection unit 103, the detected straight line storage unit 104, the parallel determination unit 105, the vehicle monitoring unit 106, and the alarm output unit 107 are substantially the same as those in the first embodiment. Thus, description thereof will be omitted here.

The representative captured image generation unit 201 obtains the determination result of the parallel determination unit 105. When the determination result indicates that the orientation of the vehicle 1 is parallel to the two straight line parts of the target marking, the representative image generation unit 201 reads the detection results of the straight center lines and the straight boundary lines stored in the detected straight line storage unit 104. Thus, the representative image generation unit 201 generates a representative captured image. The representative captured image generated at this time includes two straight center lines and four straight boundary lines that represent the two straight line parts of the target marking detected from the plurality of captured images.

When receiving from the parallel determination unit 105 the determination result indicating that the orientation of the vehicle 1 is parallel to the two straight line parts of the target marking, the preset value obtaining unit 108 obtains the preset value of the mounting angle of the in-vehicle camera 10 from the image generation device 20. Subsequently, the preset value obtaining unit 108 outputs the obtained preset value to the bird's-eye view conversion unit 109.

When receiving the mounting angle of the in-vehicle camera 10 from the preset value obtaining unit 108, the bird's-eye view conversion unit 109 coverts, into a bird's-eye view image, the representative captured image generated by the representative captured image generation unit 201.

The bird's-eye view image evaluation unit 111 analyzes a bird's-eye view image obtained by the bird's-eye view conversion of the representative captured image. On the basis of the analysis result, the bird's-eye view image evaluation unit 111 determines whether the two straight center lines and the four straight boundary lines included in the representative captured image have been correctly converted into straight lines that represent the two straight line parts of the target marking. As a result, when the lines are determined as not having been correctly converted, the preset value change unit 112 changes the preset value of the mounting angle of the in-vehicle camera 10 obtained from the storage unit 21 of the image generation device 20.

Thus, the bird's-eye view conversion unit 109 performs the bird's-eye view conversion again. Specifically, using the mounting angle after the change, the bird's-eye view conversion unit 109 converts the bird's-eye view conversion again on the representative captured image, thus generating a new bird's-eye view image.

Thus, also in the present embodiment, the bird's-eye view image evaluation unit 111 and the preset value change unit 112 correspond to the mounting angle search unit 110.

When determining that the two straight center lines and the four straight boundary lines included in the representative captured image have been correctly converted, the bird's-eye view image evaluation unit 111 outputs, to the mounting angle determination unit 113, the value of the mounting angle used in the bird's-eye view conversion at that time. As a result, the mounting angle determination unit 113 and the mounting angle update unit 114 perform substantially the same processes as the mounting angle determination unit 113 and the mounting angle update unit 114 according to the first embodiment. Specifically, the mounting angle determination unit 113 determines, as a correct value of the mounting angle (an actual value of the mounting angle), the value of the mounting angle received from the bird's-eye view image evaluation unit 111 (the value of the mounting angle used in the bird's-eye view conversion in which the lines are correctly converted). Furthermore, the mounting angle update unit 114 obtains the correct mounting angle of the in-vehicle camera 10 determined by the mounting angle determination unit 113 and writes the obtained mounting angle into the storage unit 21 in the image generation device 20. Thus, the mounting angle update unit 114 updates, into the correct value of the mounting angle, the value of the mounting angle stored in the storage unit 21 in the image generation device 20. As described above, the mounting angle calibration device 200 according to the present embodiment performs the processes of the above-mentioned units. This brings to an end the calibration of the mounting angle of the in-vehicle camera 10 which is to be used by the image generation device 20 upon generating an image (an image to be displayed on the monitor 6).

Figure 20:
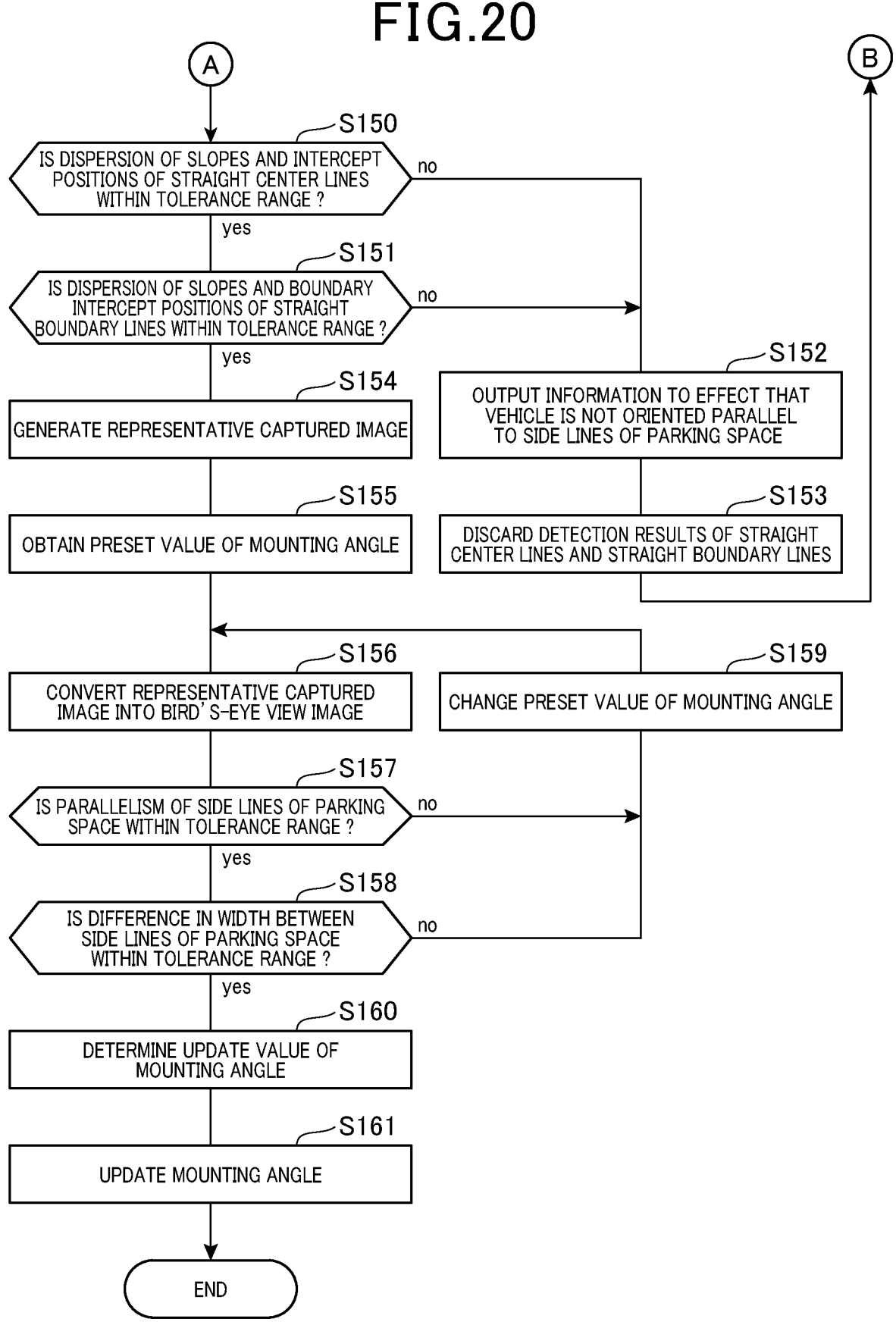
FIG. 20 is a flowchart showing a mounting angle calibration process performed by a mounting angle calibration device according to the second embodiment.

B-2. Mounting Angle Calibration Process:

FIG. 20 exemplifies a flowchart showing the mounting angle calibration process (the latter half) performed by the mounting angle calibration device 200 according to the present embodiment. The flowchart in the first half of the mounting angle calibration process according to the present embodiment is substantially the same as the flowchart in the first half of the mounting angle calibration process shown in FIG. 3. Therefore, illustration thereof will be omitted. Note that the present process is performed by the CPU included in the mounting angle calibration device 200. Specifically, in the mounting angle calibration device 200, the CPU reads a program for the mounting angle calibration process from a predetermined storage region of the memory (non-transitory tangible computer readable storage medium) or the like, and executes the program. In the subsequent description, FIG. 3 will apply for the first half of the mounting angle calibration process, and FIG. 20 will be referred to for the latter half of the mounting angle calibration process. In this way, the mounting angle calibration process according to the present embodiment will be briefly described below.

In the mounting angle calibration process according to the present embodiment, as in the first embodiment, first, the mounting angle calibration device 200 outputs an instruction to the effect that the vehicle 1 should be oriented parallel to the side lines a and b of the parking space T and the steering wheel 2 should be placed in the steering state for movement in a straight line. Subsequently, the mounting angle calibration device 200 outputs an instruction to the effect that the vehicle 1 should be moved the predetermined distance L in a straight line (corresponding to Steps S100 and S101 in FIG. 3). Afterwards, the mounting angle calibration device 200 obtains a captured image of the parking space T from the image generation device 20. The mounting angle calibration device 200 detects, from the captured image that has been obtained, the slopes of the straight center lines and the straight boundary lines, the intercept positions of the straight center lines, and the boundary intercept positions of the straight boundary lines, of the side lines a and b of the parking space T, and stores the detected slopes, intercept positions, and boundary intercept positions into the memory (corresponding to Steps S102 and S103).

The mounting angle calibration device 200 determines whether the steering wheel 2 is being maintained in the steering state for movement in a straight line. The mounting angle calibration device 200 determines whether the detection results of a predetermined number of captured images have been stored. The mounting angle calibration device 200 determines whether the travel distance of the vehicle 1 has reached the predetermined distance L (corresponding to Steps S104, S107, and S108). As a result, when determining that the steering wheel 2 is not maintained in the steering state for movement in a straight line, the mounting angle calibration device 200 discards the detection results of the straight center lines and the straight boundary lines stored in the memory. Subsequently, the mounting angle calibration device 200 outputs a warning and an instruction to the effect that the steering wheel 2 should be maintained in the steering state for movement in a straight line (corresponding to Steps S105 and S106). The processing then starts all over again. Furthermore, when determining that the travel distance of the vehicle 1 has reached the predetermined distance L, the mounting angle calibration device 200 outputs an instruction to the effect that the movement direction of the vehicle 1 should be reversed and the vehicle 1 should be moved the predetermined distance L in a straight line (corresponding to Step S109). Afterwards, the mounting angle calibration device 200 obtains a new captured image and stores the straight center lines and the straight boundary lines detected from the captured image into the memory (corresponding to Steps S102 and S103).

In the mounting angle calibration device 200, the detection results of the straight center lines and the straight boundary lines are accumulated by the repetition of such processes. Eventually, the number of captured images from which the detection results of the straight center lines and the straight boundary lines have been accumulated reaches the predetermined number (corresponding to S107: yes). With this, in the mounting angle calibration device 200, the accumulation of the straight center lines and the straight boundary lines detected from the captured images is completed.

In the mounting angle calibration process according to the present embodiment, when the accumulation of the straight center lines and the straight boundary lines detected from the predetermined number of captured images is completed, the following process is performed. Specifically, as exemplified in FIG. 20, the mounting angle calibration device 200 determines whether the dispersion of the slopes and the intercept positions of the accumulated straight center lines is within a predetermined tolerance range (Step S150). This determination is the same as that in the first embodiment (the processing in Step S110 in FIG. 4). Specifically, as described above with reference to FIG. 8, in the processing in Step S150, the slopes kbc of the straight center line bc are read, and dispersion σkbc thereof is calculated. Furthermore, the slopes kac of the straight center line ac are read, and dispersion σkac thereof is calculated. Similarly, in the processing in Step S150, the intercept positions pbc of the straight center line bc are read, and dispersion σpbc thereof is calculated. Furthermore, the intercept positions pac of the straight center line ac are read, and dispersion σpac thereof is calculated.

Furthermore, in the processing in Step S150, whether the calculated dispersion σkbc, σkac, σpbc, and σpac is within the predetermined tolerance range is determined.

As a result, when determining that the dispersion of the slopes and the intercept positions of the straight center lines is within the predetermined tolerance range (Step S150 in FIG. 20: yes), the mounting angle calibration device 200 determines whether the dispersion of the slopes and the boundary intercept positions of the straight boundary lines is within a predetermined tolerance range (Step S151). This determination is also the same as that in the first embodiment (the processing in Step S111 in FIG. 4). Specifically, as described above with reference to FIG. 8, in the processing in Step S151, the slopes kbo, kbi, kao, and kai of the straight boundary lines bo, bi, ao, and ai are read, and respective dispersion σkbo, σkbi, σkao, and σkai thereof is calculated. Similarly, in the processing in Step S151, the boundary intercept positions pbo, pbi, pao, and pai of the straight boundary lines bo, bi, ao, and ai are read, and respective dispersion σpbo, σpbi, σpao, and σpai thereof is calculated.

Furthermore, in the processing in Step S151, whether the calculated dispersion σkbo, σkbi, σkao, σkai, σpbo, σpbi, σpao, and σpai is within the predetermined tolerance range is determined.

As a result, when determining that the dispersion of the slopes and/or the intercept positions of the straight center lines are not within the predetermined tolerance range (Step S150 in FIG. 20: no), the mounting angle calibration device 200 determines that the orientation of the vehicle 1 is not parallel to the side lines a and b of the parking space T. Furthermore, when determining that the dispersion of the slopes and/or the boundary intercept positions of the straight boundary lines are not within the predetermined tolerance range (Step S151: no), the mounting angle calibration device 200 determines that the orientation of the vehicle 1 is not parallel to the side lines a and b of the parking space T.

As described above, when the "no" determination is made in the processing in Step S150 or Step S151, the mounting angle calibration device 200 outputs information to the effect that the orientation of the vehicle 1 is not parallel to the side lines a and b of the parking space T (Step S152). The mounting angle calibration device 200 discards the detection results of the straight center lines and the straight boundary lines (the data exemplified in FIG. 8) accumulated in the memory (Step S153). Subsequently, returning to the beginning of the processing (corresponding to Step S100 of FIG. 3), the mounting angle calibration device 200 starts a series of the above-described processing all over again.

In contrast, when determining that every dispersion of the slopes and the intercept positions of the straight center lines are within the predetermined tolerance range (Step S150: yes) and every dispersion of the slopes and the boundary intercept positions of the straight boundary lines are within the predetermined tolerance range (Step S151: yes), the mounting angle calibration device 200 determines that the straight center lines in the captured images are the same straight line (the positions thereof on the images match). Similarly, the straight boundary lines in the captured images are determined as the same straight line. Specifically, when each of the slope and the intercept position of the straight center line is within the predetermined tolerance range and each of the slope and the intercept position of the straight boundary line is within the predetermined tolerance range, the mounting angle calibration device 200 determines that the position relationship between the vehicle 1 and the parking space T is in the state shown in FIG. 9A. Thus, in this case, the orientation of the vehicle 1 can be determined as being parallel to the side lines a and b of the parking space T.

In the mounting angle calibration process according to the first embodiment, when the orientation of the vehicle 1 is determined as being parallel to the side lines a and b of the parking space T (Step S111 in FIG. 4: yes), a captured image for bird's-eye view conversion is obtained (Step S114).

In contrast, in the mounting angle calibration process according to the present embodiment, a representative captured image for bird's-eye view conversion is generated (Step S154 in FIG. 20). The representative captured image represents the predetermined number of captured images and is used to check that the orientation of the vehicle 1 is parallel to the side lines a and b of the parking space T.

The representative captured image will be described in detail. Assume that it was confirmed that the orientation of the vehicle 1 is parallel to the side lines a and b of the parking space T. This can be interpreted that the straight center lines and the straight boundary lines detected from a predetermined number of captured images overlap (the positions match) among the captured images (the state shown in FIG. 9A).

Figure 21A:
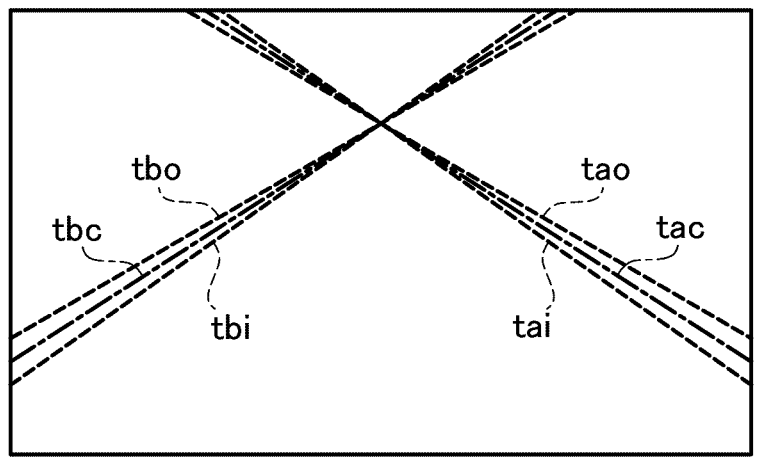
FIG. 21A shows the case of searching for a mounting angle of an in-vehicle camera through bird's-eye view conversion of a representative captured image.
Figure 21B:
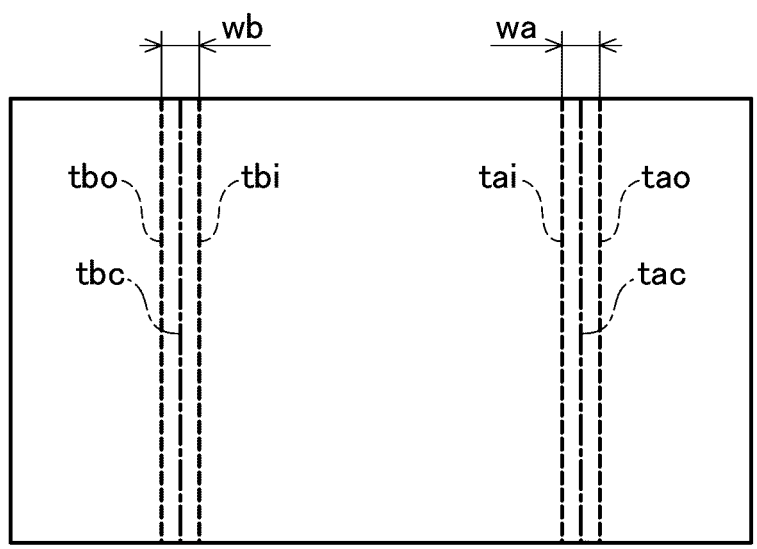
FIG. 21B shows the case of searching for a mounting angle of an in-vehicle camera through bird's-eye view conversion of a representative captured image.

Thus, in such a state, as exemplified in FIGS. 21A and 21B, for example, a representative straight center line tbc representing the straight center lines bc detected from the predetermined number of captured images and a representative straight center line tac representing the straight center lines ac detected from the predetermined number of captured images can be determined. For example, the representative straight center line tbc is determined as follows. Specifically, the mean or the median of each of the slopes kbc and the intercept positions pbc of the plurality of straight center lines bc detected from the predetermined number of captured images is calculated. A straight line, the slope and the intercept position of which are each the mean or median calculated. The calculated straight line is set as the representative straight center line tbc.

Similarly, a representative straight boundary line tbo representing the plurality of straight boundary lines bo, a representative straight boundary line tbi representing the plurality of straight boundary lines bi, a representative straight boundary line tao representing the plurality of straight boundary lines ao, and a representative straight boundary line tai representing the plurality of straight boundary lines ai can be determined.

FIGS. 21A and 21B exemplify the representative straight center lines tbc and tac and the representative straight boundary lines tbo, tbi, tao, and tai determined in this way. The representative straight center lines tbc and tac and the representative straight boundary lines tbo, tbi, tao, and tai represent parts of the side lines a and b of the parking space T appearing in the predetermined number of captured images. Thus, the representative captured image generated by the processing in Step S154 in FIG. 20 is an image such as that shown in FIG. 21A.

The above-described representative image includes the two representative straight center lines tbc and tac and the four representative straight boundary lines tbo, tbi, tao, and tai.

However, the representative captured image may include, for example, the four representative straight boundary lines tbo, tbi, tao, and tai only. In this case, it is sufficient that the mounting angle calibration device 200 accumulate the slopes and the boundary intercept positions of the straight boundary lines; the mounting angle calibration device 200 does not need to accumulate the slopes and the intercept positions of the straight center lines.

The mounting angle calibration device 200 obtains the preset value of the mounting angle of the in-vehicle camera 10 stored in the storage unit 21 in the image generation device 20 (Step S155 in FIG. 20). The mounting angle calibration device 200 converts the generated representative captured image into a bird's-eye view image (Step S156). As shown in FIG. 21A, the representative captured image includes the two representative straight center lines tbc and tac and the four representative straight boundary lines tbo, tbi, tao, and tai. Thus, the representative captured image after the bird's-eye view conversion is a bird's-eye view image such as that shown in FIG. 21B.

The mounting angle calibration device 200 analyzes the obtained bird's-eye view image, detects the side lines a and b of the parking space T in the bird's-eye view image, and determines whether the parallelism of the detected side lines a and b is within a predetermined tolerance range (Step S157). In the processing in Step S157, the parallelism of the two representative straight center lines tbc and tac in the bird's-eye view image shown in FIG. 21B, for example, is calculated. In the processing in Step S157, a determination is made according to whether the calculated parallelism is within the predetermined tolerance range.

For example, assume that the representative captured image does not include the two representative straight center lines tbc and tac. Thus, when the bird's-eye view image does not include the two representative straight center lines tbc and tac either, the following determination may be made. Specifically, whether the parallelism of the four representative straight boundary lines tbo, tbi, tao, and tai in the bird's-eye view image is within the predetermined tolerance range may be determined.

As a result, when determining that the parallelism of the side lines a and b of the parking space T is within the predetermined tolerance range (Step S157 in FIG. 20: yes), the mounting angle calibration device 200 determines whether the difference in width between the side lines a and b of the parking space T is within a predetermined tolerance range (Step S158). In the processing in Step S158, the distance between the two representative straight boundary lines tbo and tbi and the distance between the two representative straight boundary lines tao and tai in the bird's-eye view image shown in FIG. 21B, for example, are calculated. In the processing in Step S158, a determination is made according to whether the difference between the two calculated distances is within a predetermined tolerance range.

When determining that the parallelism of the side lines a and b of the parking space T is not within the predetermined tolerance range (Step S157 in FIG. 20: no), the mounting angle calibration device 200 determines the mounting angle of the in-vehicle camera 10 used in the bird's-eye view conversion as not being correct. Furthermore, also when determining that the difference in width between the side lines a and b of the parking space T is not within the predetermined tolerance range (Step S158: no), the mounting angle calibration device 200 determines the mounting angle of the in-vehicle camera 10 used in the bird's-eye view conversion as not being correct.

The mounting angle calibration device 200 changes the preset value of the mounting angle (Step S159), and converts the representative captured image into a bird's-eye view image again using the mounting angle after the change (Step S156). Subsequently, the mounting angle calibration device 200 determines, by analyzing the obtained bird's-eye view image, whether the parallelism between the side lines a and b of the parking space T in the bird's-eye view image is within the predetermined tolerance range and whether the difference in width between the side lines a and b of the parking space T is within the predetermined tolerance range (Steps S157 and S158). In this way, the mounting angle calibration device 200 repeats the above determination until the condition is met. Thus, a correct mounting angle of the in-vehicle camera 10 with respect to the vehicle 1 is retrieved by search.

When determining that the parallelism of the side lines a and b of the parking space T in the bird's-eye view image is within the predetermined tolerance range and the difference in width between the side lines a and b of the parking space T is within the predetermined tolerance range (Step S157: yes and Step S158: yes in FIG. 20), the mounting angle calibration device 200 determines, as an update value of the mounting angle (a correct value of the mounting angle), the value of the mounting angle used in the bird's-eye view conversion at that time (Step S160).

The mounting angle calibration device 200 writes the determined update value of the mounting angle into the storage unit 21 in the image generation device 20, thereby updating the preset value of the mounting angle stored in the storage unit 21 (Step S161). Then, the mounting angle calibration process according to the present embodiment is brought to an end.

Note that also in the above-described mounting angle calibration process, the processing from Step S100 in FIG. 3 to Step S160 in FIG. 20 corresponds to the mounting angle detection process for detecting a mounting angle of the in-vehicle camera 10.

As described in detail above, the mounting angle calibration device 200 (the mounting angle calibration process) including the mounting angle detection device 220 according to the present embodiment converts the representative captured image including two representative straight center lines and four representative straight boundary lines into a bird's-eye view image. Therefore, the mounting angle calibration device 200 can directly calculate the representative straight center lines and the representative straight boundary lines from the bird's-eye view image. Thus, in the mounting angle calibration device 200 according to the present embodiment, the parking space T in the bird's-eye view image is detected, and even if the side lines a and b of the parking space T have not been detected, whether the two side lines a and b have been correctly converted into a bird's-eye view image can be easily determined.

Furthermore, the mounting angle calibration device 200 converts, into a bird's-eye view image, the representative captured image representing the predetermined number of captured images. Therefore, the mounting angle calibration device 200 according to the present embodiment is not affected by noise included in the captured image. Thus, a correct mounting angle of the in-vehicle camera 10 with respect to the vehicle 1 can be stably detected.

C. Variation

Each of the above-described embodiments can be modified as follows. As described above with reference to FIG.

10, when the widths of the two side lines a and b are not equal, there is an offset in the positions of the end points of the two side lines a and b (refer to FIG. 10C). In contrast, when the widths of the two side lines a and b are equal, there is no offset in the positions of the end points of the two side lines a and b (refer to FIG. 10D).

Thus, in the mounting angle calibration device according to the present variation, the mounting angle of the in-vehicle camera 10 may be retrieved by the search, focusing on the positions of the end points of the two side lines a and b instead of the difference in width between the two side lines a and b.

Figure 22A:
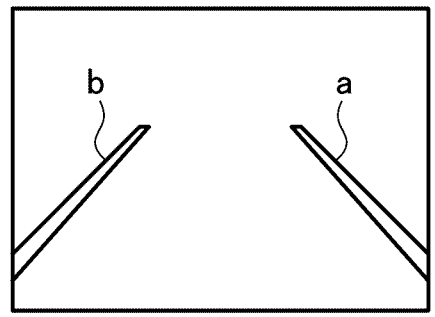
FIG. 22A shows a variation of searching for a mounting angle of an in-vehicle camera, focusing on the positions of two side lines of a parking space and end points of the side lines.
Figure 22B:
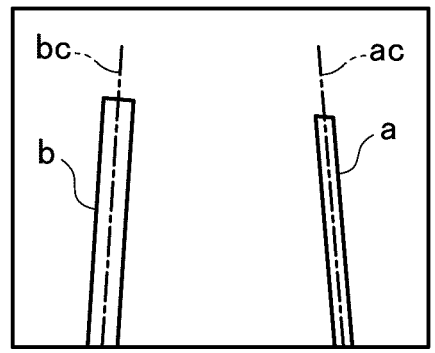
FIG. 22B shows a variation of searching for a mounting angle of an in-vehicle camera, focusing on the positions of two side lines of a parking space and end points of the side lines.

For example, assume that the captured image is the image shown in FIG. 22A. Furthermore, assume that the bird's-eye view conversion of this captured image results in the bird's-eye view image shown in FIG. 22B. In this case, the straight center line bc of the side line b and the straight center line ac of the side line a in the bird's-eye view image are not parallel. Therefore, it is possible to determine that the mounting angle used in the bird's-eye view conversion is not correct.

Figure 22C:
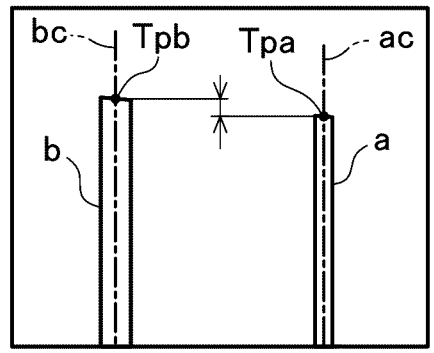
FIG. 22C shows a variation of searching for a mounting angle of an in-vehicle camera, focusing on the positions of two side lines of a parking space and end points of the side lines.

Thus, assume that continuous search for the mounting angle of the in-vehicle camera 10 results in the bird's-eye view image shown in FIG. 22C. In this case, the straight center line bc of the side line b and the straight center line ac of the side line a in the bird's-eye view image are parallel. However, there is an offset between the position of an end point Tpb of the side line b and the position of an end point Tpa of the side line a. Therefore, it is possible to determine that the mounting angle used in the bird's-eye view conversion is not correct.

Figure 22D:
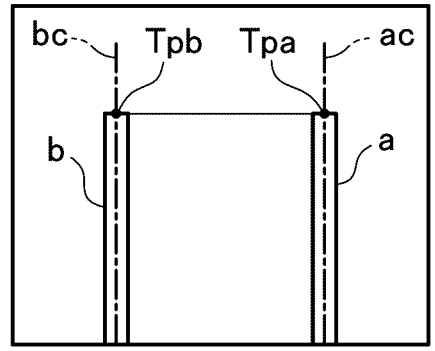
FIG. 22D shows a variation of searching for a mounting angle of an in-vehicle camera, focusing on the positions of two side lines of a parking space and end points of the side lines.

Furthermore, assume that continuous search for the mounting angle of the in-vehicle camera 10 results in the bird's-eye view image shown in FIG. 22D. In this bird's-eye view image, the straight center line bc of the side line b and the straight center line ac of the side line a are parallel, and there is no offset between the position of the end point Tpb of the side line b and the position of the end point Tpa of the side line a. In this case, it is possible to determine that the mounting angle used in the bird's-eye view conversion is correct.

Thus, the mounting angle calibration device according to the present variation, the mounting angle of the in-vehicle camera 10 is searched for until a bird's-eye view image in which the side lines a and b of the parking space T are parallel and there is no offset between the positions of the end points of the side lines a and b of the parking space T is obtained. Thus, a correct mounting angle of the in-vehicle camera 10 with respect to the vehicle 1 can be determined.

In the above-described mounting angle calibration device according to the present variation, the mounting angle of the in-vehicle camera 10 is searched for on the basis of the parallelism of the side lines a and b of the parking space T and the positions of the end points of the side lines a and b of the parking space T. Thus, in the mounting angle calibration process, as described above with reference to FIG. 18, the mounting angle of the in-vehicle camera 10 is detected even when the parking space T does not have the transverse line c. As a result, the mounting angle can be calibrated to a correct mounting angle.

Although the embodiments and the variation thereof have been described above, the technique of the present disclosure is not limited to the above-described content. The technique of the present disclosure can be applied in various forms without departing from the teachings thereof.

REFERENCE SIGNS LIST

1 . . . Vehicle
10 . . . In-vehicle camera
20 . . . Image generation device
100 . . . Mounting angle calibration device
101 . . . Captured image obtaining unit
102 . . . Straight center line detection unit
103 . . . Straight boundary line detection unit
104 . . . Detected straight line storage unit
105 . . . Parallel determination unit
106 . . . Vehicle monitoring unit
107 . . . Alarm output unit
108 . . . Preset value obtaining unit
109 . . . Bird's-eye view conversion unit
110 . . . Mounting angle search unit
111 . . . Bird's-eye view image evaluation unit
112 . . . Preset value change unit
113 . . . Mounting angle determination unit
114 . . . Mounting angle update unit
120 . . . Mounting angle detection device
200 . . . Mounting angle calibration device
201 . . . Representative captured image generation unit
220 . . . Mounting angle detection device

The invention claimed is:

1. A mounting angle detection device which detects a mounting angle at which an in-vehicle camera for capturing an image of a ground around a vehicle is mounted on the vehicle, the mounting angle detection device comprising:
a captured image obtaining unit which obtains a captured image of the ground on which a target marking having two straight line parts parallel to each other and equal in width is marked;
a bird's-eye view conversion unit which obtains a preset value of the mounting angle of the in-vehicle camera with respect to the vehicle, and converts the captured image into a bird's-eye view image assuming that the in-vehicle camera is mounted according to the preset value, the bird's-eye view image being an image in which the ground appearing in the captured image appears as if viewed from above;
a mounting angle search unit which, by changing the preset value of the mounting angle to be used in bird's-eye view conversion, searches for the mounting angle at which both parallelism of the two straight line parts of the target marking in the bird's-eye view image and a difference in width between the two straight line parts of the target marking in the bird's-eye view image are within predetermined tolerance ranges; and
a mounting angle determination unit which determines, as the mounting angle of the in-vehicle camera with respect to the vehicle, the mounting angle retrieved by searching by the mounting angle search unit.

2. The mounting angle detection device according to claim 1, wherein
the in-vehicle camera is mounted forward or rearward of the vehicle,
the captured image obtaining unit obtains a plurality of captured images that are images captured from different positions while the vehicle is moved in a straight line along a direction of the two straight line parts of the target marking,
the mounting angle detection device further comprises:
a straight center line detection unit which detects the two straight line parts of the target marking from the captured image, and detects slopes of two straight center lines that are extensions of the two straight line parts and intercept positions at which the two straight center lines cross a predetermined edge of the captured image in a state where the two straight center lines have been identified; and a parallel determination unit which stores the slopes and the intercept positions of the two straight center lines detected from each of the plurality of the captured images in the state where the two straight center lines have been identified, and when deviations in the slopes and the intercept positions of respective ones of the two straight center lines are within predetermined tolerance ranges, determines that the vehicle is parallel to the two straight line parts of the target marking, and the mounting angle search unit searches for the mounting angle when the vehicle is determined as being parallel to the two straight line parts of the target marking.

3. The mounting angle detection device according to claim 2, further comprising a straight boundary line detection unit which detects the two straight line parts of the target marking from the captured image, and detects slopes of four straight boundary lines that are extensions of inner and outer straight lines of the two straight line parts and boundary intercept positions at which the four straight boundary lines cross a predetermined edge of the captured image in a state where the four straight boundary lines have been identified, the two straight line parts having predetermined widths, wherein the parallel determination unit stores the slopes and the boundary intercept positions of the four straight boundary lines detected from each of the plurality of the captured images in the state where the four straight boundary lines have been identified, and when deviations in the slopes and the boundary intercept positions of respective ones of the four straight boundary lines are within predetermined tolerance ranges, determines that the vehicle is parallel to the two straight line parts of the target marking, and the mounting angle search unit searches for the mounting angle when the vehicle is determined as being parallel to the two straight line parts of the target marking.

4. The mounting angle detection device according to claim 3, further comprising a representative captured image generation unit which, when the vehicle is determined as being parallel to the two straight line parts of the target marking, determines four representative straight boundary lines representing the four straight boundary lines based on a result of extracting the four straight boundary lines from each of the plurality of the captured images, and generates a representative captured image representing the plurality of the captured images by representing the two straight line parts of the target marking with the four representative straight boundary lines, wherein the bird's-eye view conversion unit generates the bird's-eye view image by bird's-eye view conversion of the representative captured image.

5. The mounting angle detection device according to claim 1, further comprising:

a vehicle monitoring unit which monitors a steering angle of the vehicle while the captured image is obtained; and an alarm output unit which outputs an alarm when the vehicle is not moving in a straight line while the captured image is obtained.

6. A mounting angle calibration device which calibrates a mounting angle at which an in-vehicle camera for capturing an image of a ground around a vehicle is mounted on the vehicle, the mounting angle calibration device comprising:

a captured image obtaining unit which obtains a captured image of the ground on which a target marking having two straight line parts parallel to each other and equal in width is marked;

a bird's-eye view conversion unit which obtains a preset value of the mounting angle of the in-vehicle camera with respect to the vehicle, and converts the captured image into a bird's-eye view image assuming that the in-vehicle camera is mounted according to the preset value, the bird's-eye view image being an image in which the ground appearing in the captured image appears as if viewed from above;

a mounting angle search unit which, by changing the preset value of the mounting angle to be used in bird's-eye view conversion, searches for the mounting angle at which both parallelism of the two straight line parts of the target marking in the bird's-eye view image and a difference in width between the two straight line parts of the target marking in the bird's-eye view image are within predetermined tolerance ranges; and a mounting angle update unit which updates the preset value of the mounting angle based on the mounting angle retrieved by searching by the mounting angle search unit, and calibrates the mounting angle of the in-vehicle camera with respect to the vehicle.

7. The mounting angle detection device according to claim 6, wherein the in-vehicle camera is mounted forward or rearward of the vehicle, the captured image obtaining unit obtains a plurality of captured images that are images captured from different positions while the vehicle is moved in a straight line along a direction of the two straight line parts of the target marking, the mounting angle detection device further comprises:

a straight center line detection unit which detects the two straight line parts of the target marking from the captured image, and detects slopes of two straight center lines that are extensions of the two straight line parts and intercept positions at which the two straight center lines cross a predetermined edge of the captured image in a state where the two straight center lines have been identified; and a parallel determination unit which stores the slopes and the intercept positions of the two straight center lines detected from each of the plurality of the captured images in the state where the two straight center lines have been identified, and when deviations in the slopes and the intercept positions of respective ones of the two straight center lines are within predetermined tolerance ranges, determines that the vehicle is parallel to the two straight line parts of the target marking, and the mounting angle search unit searches for the mounting angle when the vehicle is determined as being parallel to the two straight line parts of the target marking.

8. A mounting angle detection method for detecting a mounting angle at which an in-vehicle camera for capturing an image of a ground around a vehicle is mounted on the vehicle, the mounting angle detection method comprising:

a captured image obtaining step of obtaining a captured image of the ground on which a target marking having two straight line parts parallel to each other and equal in width is marked;

a preset value obtaining step of obtaining a preset value of the mounting angle of the in-vehicle camera with respect to the vehicle;

a bird's-eye view conversion step of converting the captured image into a bird's-eye view image when the preset value is obtained, assuming that the in-vehicle camera is mounted on the vehicle according to the preset value, the bird's-eye view image being an image in which the ground appearing in the captured image appears as if viewed from above;

a determination step of detecting parallelism of the two straight line parts of the target marking in the bird's-eye view image and a difference in width between the two straight line parts, and determining whether the parallelism and the difference in width of the two straight line parts that have been detected are within predetermined tolerance ranges;

a mounting angle search step of when any of the parallelism and the difference in width of the two straight line parts that have been detected is not within the predetermined tolerance ranges, searching for the mounting angle at which both the parallelism and the difference in width of the two straight line parts are within the predetermined tolerance ranges, by changing the preset value of the mounting angle of the in-vehicle camera; and a mounting angle determination step of determining, as the mounting angle of the in-vehicle camera with respect to the vehicle, the mounting angle retrieved by the search.

9. The mounting angle detection method according to claim 8, which is applied to the in-vehicle camera for capturing an image of a ground located forward or rearward of the vehicle, wherein in the captured image obtaining step, a plurality of captured images that are images captured from different positions are obtained while the vehicle is moved in a straight line along a direction of the two straight line parts of the target marking, the mounting angle detection method further comprises:

a straight center line detection step of detecting the two straight line parts of the target marking from the captured image, detecting slopes of two straight center lines that are extensions of the two straight line parts and intercept positions at which the two straight center lines cross a predetermined edge of the captured image in a state where the two straight center lines have been identified, and storing the slopes and the intercept positions into a predetermined storage device; and a parallel determination step of when deviations in the slopes and the intercept positions of the two straight center lines detected from each of the plurality of the captured images are within predetermined tolerance ranges, determining that the vehicle is parallel to the two straight line parts of the target marking, and in the preset value obtaining step, the preset value of the mounting angle is obtained when the vehicle is determined as being parallel to the two straight line parts of the target marking.

* * * * *